United States Patent
Orgeron et al.

(10) Patent No.: US 9,726,211 B2
(45) Date of Patent: Aug. 8, 2017

(54) 5 DEGREES OF FREEDOM ALIGNMENT-CORRECTING PRELOADED BEARING CONNECTION SYSTEM

(71) Applicant: Schlumberger Technology Corporation, Sugar Land, TX (US)

(72) Inventors: Keith J. Orgeron, Spring, TX (US); Robert Metz, Cypress, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 320 days.

(21) Appl. No.: 14/216,546

(22) Filed: Mar. 17, 2014

(65) Prior Publication Data

US 2014/0314467 A1 Oct. 23, 2014

Related U.S. Application Data

(60) Provisional application No. 61/800,895, filed on Mar. 15, 2013, provisional application No. 61/821,617, filed on May 9, 2013.

(51) Int. Cl.
```
F16B 19/02      (2006.01)
F16C 35/02      (2006.01)
F16C 11/04      (2006.01)
```
(52) U.S. Cl.
CPC ............ *F16B 19/02* (2013.01); *F16C 11/045* (2013.01); *F16C 35/02* (2013.01); *Y10T 403/1624* (2015.01)

(58) Field of Classification Search
CPC ........... Y10T 403/76; Y10T 403/32926; Y10T 403/32918; Y10T 403/32861;
(Continued)

(56) References Cited

U.S. PATENT DOCUMENTS

| | | | |
|---|---|---|---|
| 1,667,610 | A | 4/1928 | Tewsley |
| 2,244,734 | A | 6/1941 | Severance |

(Continued)

FOREIGN PATENT DOCUMENTS

| | | |
|---|---|---|
| GB | 2170266 A | 7/1986 |
| WO | 2007008372 A1 | 1/2007 |

OTHER PUBLICATIONS

"Bondura Design Manual for Equipment Manufacturers", Bolt Norge as, Mar. 2010.

*Primary Examiner* — Joshua J Michener
*Assistant Examiner* — Keith Minter
(74) *Attorney, Agent, or Firm* — Rachel E. Greene

(57) ABSTRACT

Exemplary embodiments provide a rotary misalignment-compensation bushing connection system that may be used in large-scale operations where several components are mounted in alignment on a single pin. For example, the misalignment-compensation system may be used in preloaded connection of a male lug rotatably mounted between a first lug and a second lug, on heavy equipment, for example, oil field exploration and production equipment. The misalignment-compensation system includes tapered cone bushings and surrounding counter-tapered cup bushings that expand in diameter and align the connection system as it is torqued together assembling the components to the pin.

20 Claims, 21 Drawing Sheets

(58) Field of Classification Search
CPC ..... Y10T 403/32951; Y10T 403/32959; Y10T 403/32221; Y10T 403/32909; Y10T 403/7051; Y10T 403/7052; Y10T 403/7054; Y10T 403/7056; Y10T 403/7058; Y10T 403/32606; F16C 35/02; F16C 11/045; F16C 2226/16; F16B 19/02; F16D 1/094; F16D 2001/0945; E02F 9/006
USPC ..................................................... 403/408.1
See application file for complete search history.

(56) References Cited

U.S. PATENT DOCUMENTS

| | | | |
|---|---|---|---|
| 2,398,459 A | 4/1946 | Province | |
| 2,875,004 A | 2/1959 | McNicoll | |
| 3,106,432 A | 10/1963 | Opferkuch | |
| 3,807,820 A | 4/1974 | Schuhmann | |
| 3,816,013 A | 6/1974 | Schuhmann | |
| 4,089,613 A | 5/1978 | Babbitt, Jr. | |
| 4,309,123 A | 1/1982 | Moore et al. | |
| 4,398,862 A | 8/1983 | Schroeder | |
| 4,507,005 A | 3/1985 | Siewert et al. | |
| 4,634,299 A | 1/1987 | Svensson | |
| 4,652,167 A | 3/1987 | Garman | |
| 4,684,280 A | 8/1987 | Dirkin et al. | |
| 4,815,191 A | 3/1989 | Garman et al. | |
| 5,009,523 A | 4/1991 | Folger et al. | |
| 5,120,195 A | 6/1992 | Schmaling et al. | |
| 5,188,463 A | 2/1993 | Heinrich et al. | |
| 5,251,986 A | 10/1993 | Arena | |
| 5,549,395 A | 8/1996 | Sink | |
| 5,961,141 A | 10/1999 | Goel | |
| 6,126,321 A | 10/2000 | Fetty et al. | |
| 6,547,613 B1 * | 4/2003 | Onoue | B63H 23/34 440/75 |
| 7,377,530 B2 | 5/2008 | Ziech et al. | |
| 7,441,960 B2 | 10/2008 | Brandenstein et al. | |
| 7,534,047 B2 | 5/2009 | Reed | |
| 7,607,836 B2 | 10/2009 | Mason et al. | |
| 2005/0117966 A1 | 6/2005 | Steinbeck | |

* cited by examiner

5 DEGREES OF FREEDOM ALIGNMENT-CORRECTING PRELOADED BEARING CONNECTION SYSTEM

TECHNICAL FIELD OF INVENTION

The present invention relates to a misalignment-compensating bushing system for use in apparatus for subterranean exploration. The present invention may be retrofitted to an existing large scale apparatus, such as the equipment used in connection with oil field operations. In particular, the invention provides misalignment compensation in an apparatus that has several large scale components, such as lugs, mounted side-by-side to a single pin where one lug rotates about the pin while others are immobile on the pin.

BACKGROUND OF THE INVENTION

In engineering machinery, it is often useful to mount components to a common pin, where one rotates relative to other stationary components mounted to the common pin. Such pins are frequently used in heavy engineering structural machines, such as mechanical structures used in exploration for oil, gas and geothermal energy, drilling operations, pipe handling equipment, and the like. In heavy engineering equipment, the alignment of multiple large and heavy components on a single common pin, presents several design issues. For example, it is readily apparent that an angular misalignment at the pin that might be within an expected tolerance, when traced along a length of a structure extending several meters (or feet) from the pin may result in the far end of the component extending several inches out of its intended position. This might be sufficient to interfere with other components aligned on the same pin and may cause excessive wear on mechanical components due to cyclical uneven loads, or may even cause a catastrophic collision with other equipment or workers.

It is desirable from the standpoint of mechanical reliability to ensure that all heavy mechanical components mounted to a pin are aligned as near perfectly on the pin as possible. One approach to improving alignment is to alter the shape of the pin to use its shape to assist in alignment. However, such multi-shaped pins are more expensive to manufacture with precision, and present additional engineering challenges of their own. More commonly, large cylindrical pins are used as being easier to control dimensionally, and less expensive to make and to inventory. Accordingly, other technologies are needed that may be used with a cylindrical pin. Desirably, these technologies should also minimize or compensate for misalignment of components mounted on the pin.

In some circumstances, once components are mounted to a load bearing pin, the components and the bushing assembly have to be tightened at both ends of the pin to lock all the component parts together. However, in many situations, one side of the assembly may not be readily accessible. Accordingly, there is a need for a rotatable bushing connection system that permits tightening from one side only and that also minimizes or compensates for any misalignment of components mounted on the pin. Still further, there is a need for a rotatable bushing connection system that does not require any modification to the components being mounted.

SUMMARY

The following is a summary of some aspects and exemplary embodiments of the present technology, of which a more detailed explanation is provided under the Detailed Description section, here below.

The invention provides a rotary misalignment-compensation bushing connection system that may be used in large scale operation where several components must be mounted side-by-side in alignment on a single pin, and where one of the components rotates about the pin. For example, the misalignment-compensation system may be used in preloaded connection of a male lug rotatably mounted between stationary first and second lugs, on heavy equipment, for example, oil field exploration and production equipment or other heavy machinery.

In an exemplary embodiment, the misalignment-compensating rotary bushing connection system has a second threaded hole in the second end of the pin. A center spacer is located over the pin and is substantially centered along the length of the pin. The system also includes a pair of sleeve bearings, one located on each side of the center spacer and surrounding at least a portion of the pin. An inner cone bushing is located on each sleeve bearing, and an inner cup bushing is located on each inner cone bushing. The system has a pair of thrust bearings located on the pin, and extending at least partially circumferentially around the pin, each of the thrust bearings positioned adjacent to a sleeve bearing on an outboard side of the inner cone bushings. In addition, the exemplary misalignment-compensating rotary bushing connection system has a pair of outer cone bushings located on and surrounding the pin. The second outer cone bushings are each adjacent to an outboard side of a thrust bearing. An outer cup bushing is located on top of and is located on each outer cone bushing. Further, the connection system includes a first and a second retainer cap, each having an internal side and an external side, and a connecting passage from the internal to the external side. The internal side of each cap has a compression boss, and a relief receivable of one of the ends of the pin. The external side of the cap is configured to engage a fastening tool, and has a radial slot or bore receivable of a locking pin.

In the above exemplary embodiment, each of the pairs of inner cup bushings and inner cone bushings have a first complementary counter-taper, and each of the pairs of the outer cup bushings and the outer cone bushings have a second complementary counter-taper. Accordingly, when the connection system is assembled, and tightened with a fastening tool, the first and second complementary counter-tapers, respectively, permit sliding engagement and expand the diameter of the exemplary embodiment. As the diameter expands during tightening, the bores of the lugs are engaged, and the lugs are urged into proper alignment.

In exemplary embodiments, grooves may be applied to outer surfaces of any one or more of the inner cone bushing, the inner cup bushing, the outer cone bushing and the outer cup bushing. Moreover, in other exemplary embodiments, slots shorter than an axial length of the cone bushing may be provided, for example, extending axially through a thickness of the outer cone bushings, and extending from opposite ends of the outer cone bushings.

In exemplary embodiments, low friction coatings may be applied selectively to certain of the inner and outer bores of the cones and the inner bores of the cups; these coatings, in combination with the utilization of higher friction surfaces on some elements, can be utilized to ensure full makeup of all elements of the assembly without requiring excessive axial force applied through the tightening mechanism.

In an alternate embodiment, the pin may have a first portion and a second portion. The first portion may be substantially cylindrical, and the second portion may be substantially frusto-conical in shape, with cone diameter increasing with distance from the first portion. The outer surface of the second portion edge is separated from the outer surface of the first portion by a ledge having a radial depth. The frusto-conical second portion replaces one of the outer cone bushings of the embodiment described. Further this embodiment only requires a single retainer cap.

In other exemplary embodiments, the retainer cap may be configured in a variety of different ways to prevent rotation of the retainer cap relative to the center pin when a fastener is torqued into the threaded bore of the pin.

BRIEF DESCRIPTION OF THE DRAWINGS

The foregoing aspects, and many of the attendant advantages, of the present technology will become more readily appreciated by reference to the following Detailed Description, when taken in conjunction with the accompanying simplified drawings of exemplary embodiments. The drawings, briefly described here below, are not to scale, are presented for ease of explanation and do not limit the scope of the inventions recited in the accompanying patent claims.

DETAILED DESCRIPTION OF EXEMPLARY EMBODIMENTS

Figure 1:
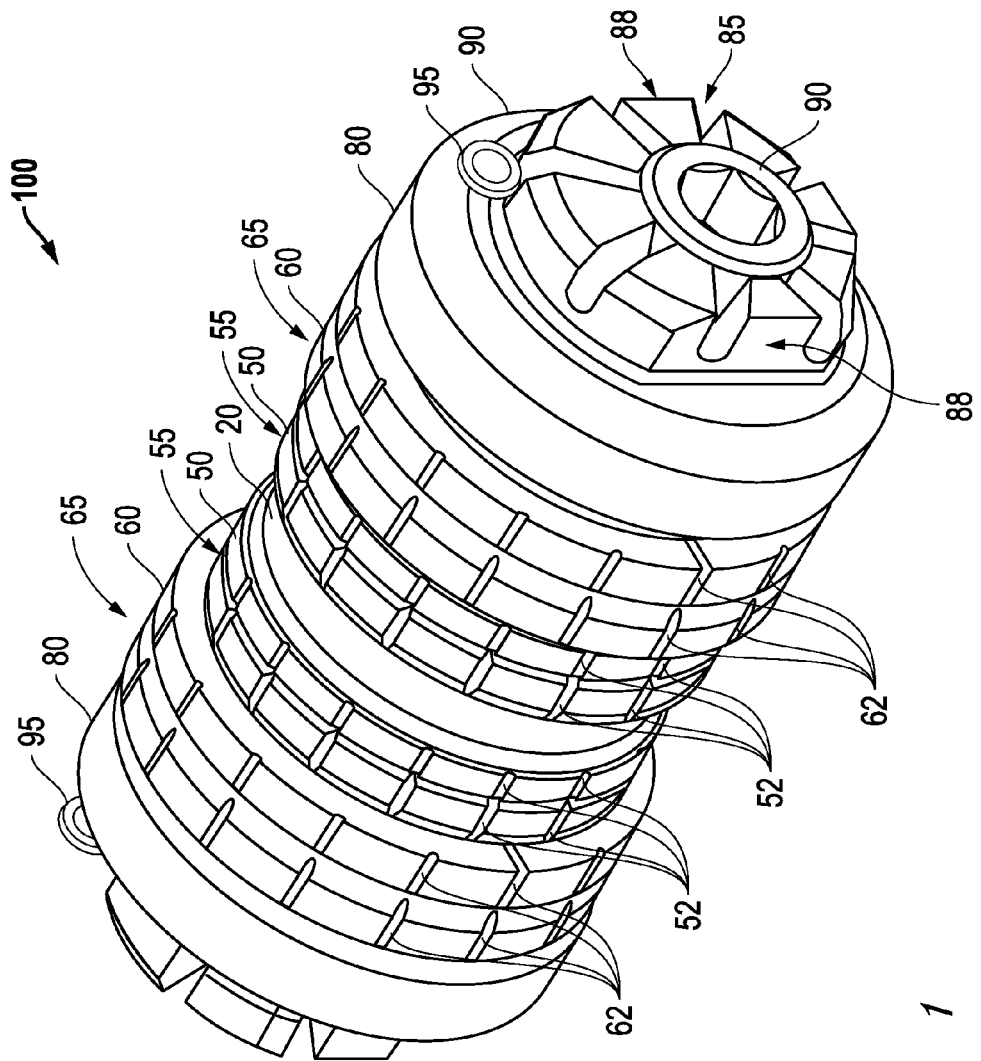
FIG. 1 is an illustration depicting a first exemplary embodiment of the misalignment-compensating rotary bushing connection system.
Figure 2:
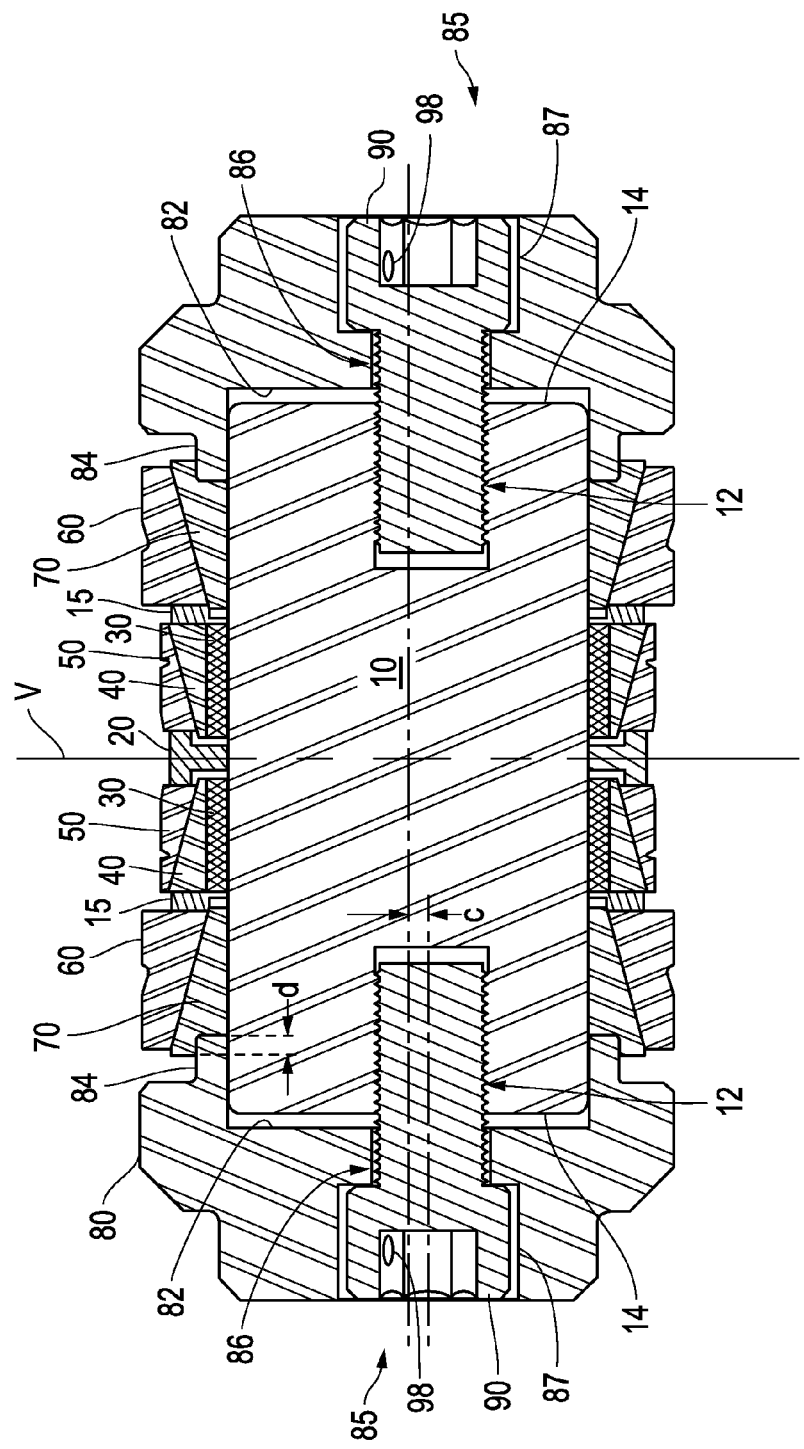
FIG. 2 is a cross sectional view of the first embodiment.

The following non-limiting detailed descriptions of examples of embodiments of the invention may refer to appended Figure drawings, but are not limited to the drawings, which are merely presented for enhancing explanations of features and aspects of the inventive technology. In addition, the detailed descriptions may refer to particular terms of art, some of which are defined herein, as appropriate and necessary for clarity.

In exemplary embodiments of the misalignment-compensating rotary bushing connection system there are generally a pair of inner cup-and-cone bushings that are nested together and are located axially side-by-side, each on a sleeve bearing that is located on either side of a center of the central pin of the connection system. A spacer is also located on the pin, between each set of inner cup-and-cone bushings. The inner cup-and-cone bushings bear on a lug (or pair of lugs) that rotates around the pin, and the inner cup-and-cone bushings (and the sleeve bearings) rotate with the lug around the pin. Accordingly, structure and surfaces are utilized to promote this motion, and to maximize slippage with respect to the pin, for the sake of efficiency. In contrast, the exemplary embodiments also have a pair of outer cone-and-cup bushings (or cup-on flared-pin-end) combinations that bear on lugs that are immobile. Thus, for these components, slippage is minimized between the pin and these components. The non-rotating components are axially separated from the rotating components by a pair of thrust bearings, thus minimizing slippage between the rotating and non-rotating components, i.e., the inner cup-and-cone bushings and the outer cup-and-cone bushings.

A first exemplary embodiment 100 of the misalignment-compensating rotary bushing connection system is shown in FIGS. 1, 2, 3, and 3A-C. The first embodiment is symmetrical about the vertical axis V. Accordingly, the description that follows may focus at times on only one side of V, but applies to the other side as well. In addition, locations closer to the vertical axis V are termed "inboard" relative to those farther from the axis V, which are termed "outboard." The first embodiment is configured for preloaded connection of a male lug that is rotatably mounted between a first immobile lug and a second immobile lug (also called female lugs). In embodiment 100, there is a central, substantially-cylindrical pin 10 configured to fit within a bore in a series of male and female lugs, such that the central male lug only rotates about the pin. Pin 10 has a threaded hole 12 in each of its two ends 14. These threaded holes 12 are off center, in this embodiment, by a distance c, as depicted. The distance c is approximately 3 to 10% of the diameter of pin 10. The offset c permits the entire assembly 100 to be immobilized from one end to allow a fastener to be screwed into the threaded hole 12. In addition, the circumferential edges of ends 14 are chamfered, for example, at an angle of about 45 degrees or a larger or smaller angle.

Figure 3:
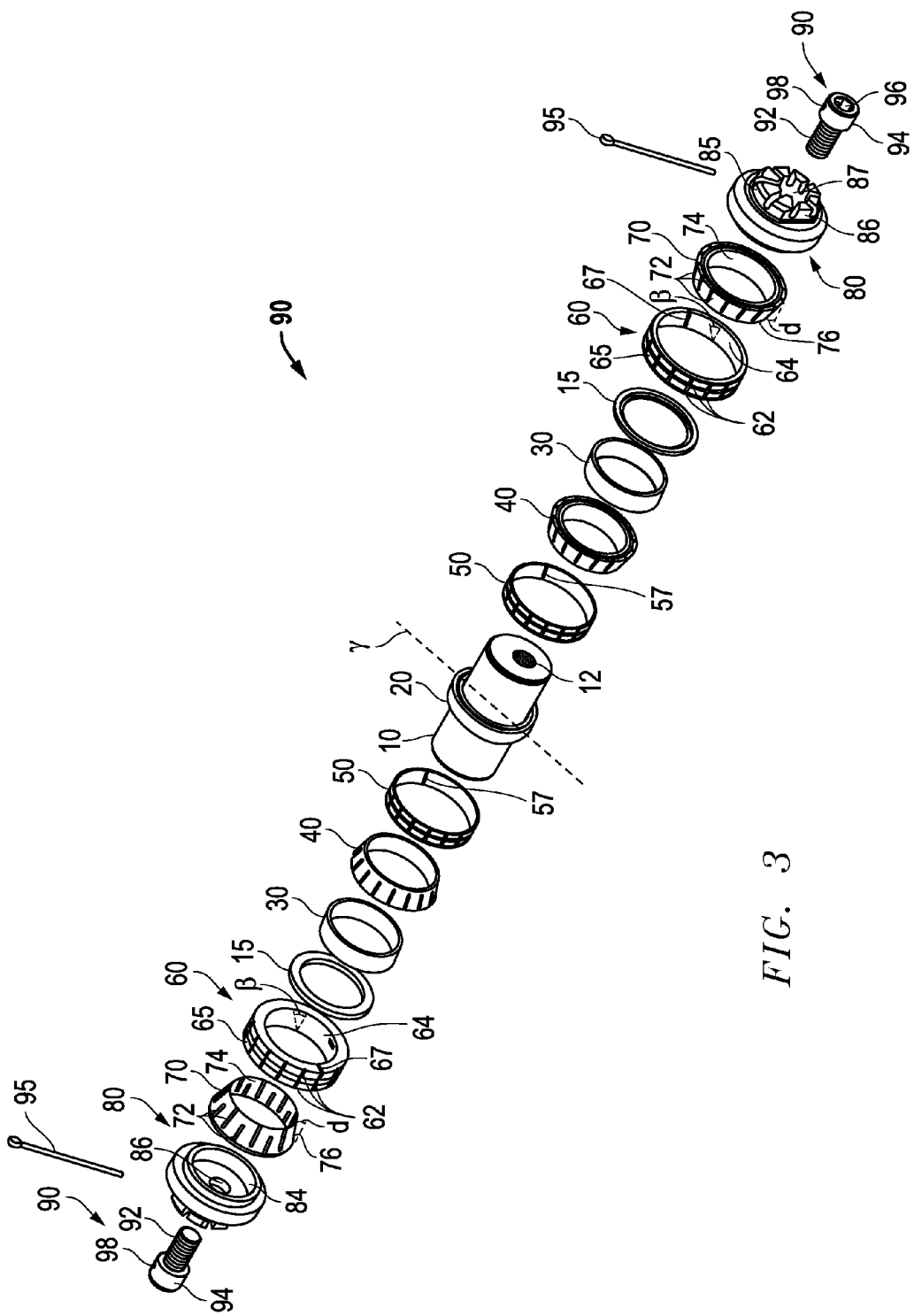
FIG. 3 is an exploded view showing detail of the components of the first embodiment.
Figure 3A:
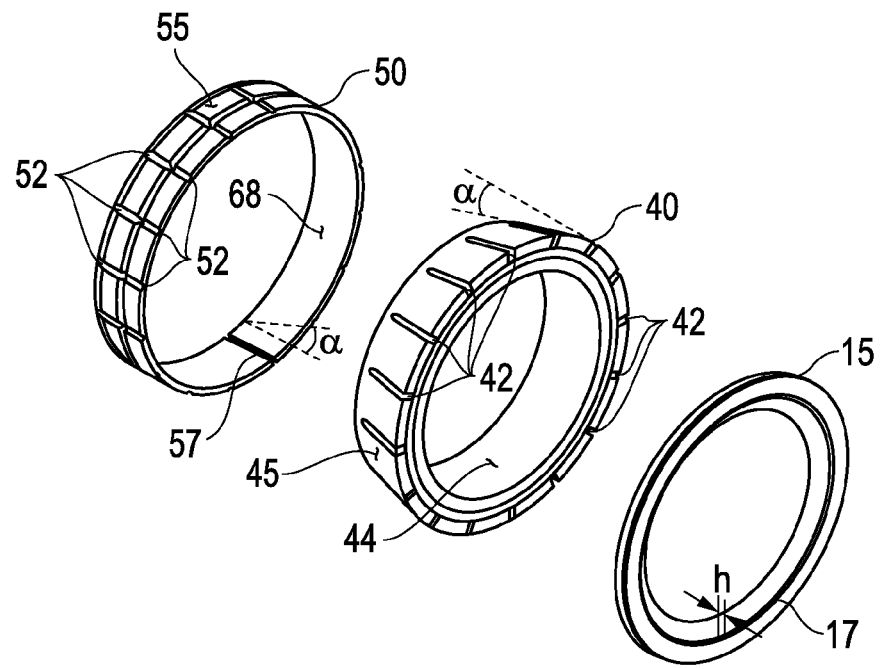
FIG. 3A is an exploded view showing detail of certain components (shown on the right-hand side in FIG. 3) of the first embodiment.
Figure 3B:
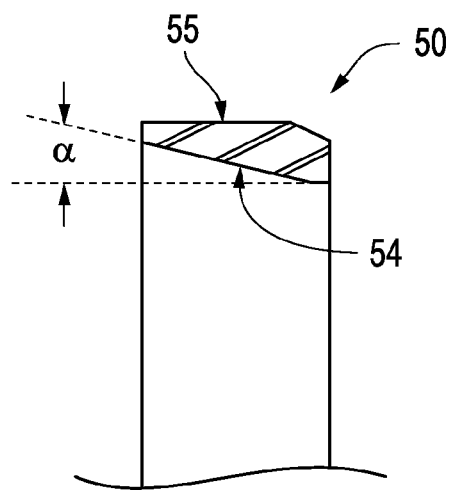
FIG. 3B is a cross section through a portion of an exemplary inner cup bushing (shown on the right-hand side in FIG. 3) of the first embodiment showing the internal taper angle.
Figure 3C:
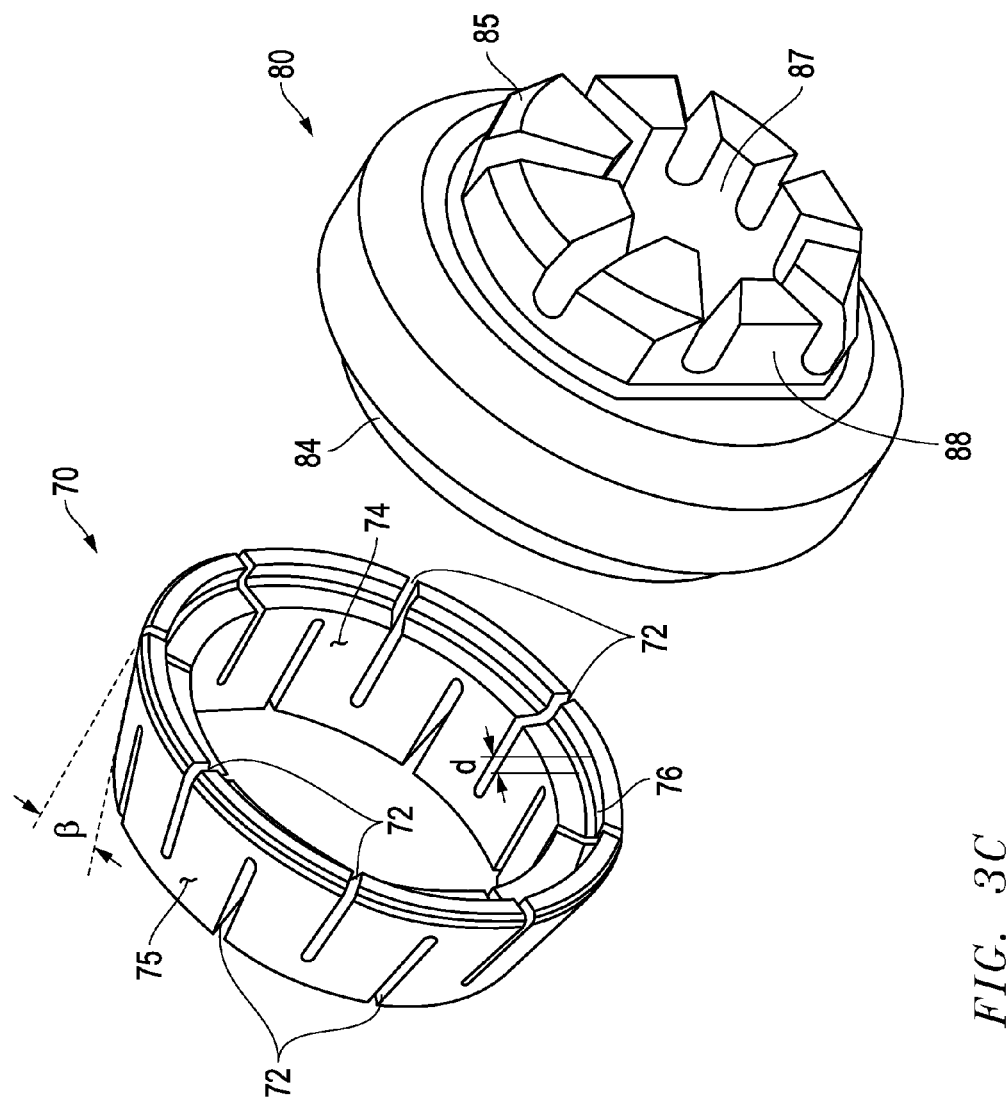
FIG. 3C is an illustration of an exemplary outer cone bushing of the first embodiment showing the external taper angle.

As best seen in the illustrated embodiment in FIG. 3, an annular central spacer 20 is located on the pin 10. Spacer 20 has a T-shaped cross. In other embodiments, a spacer may be omitted or have a different cross-sectional shape to accommodate the particular bore characteristics of a lug being mounted. Spacer 20 is flanked on each side by a sleeve bearing 30 that is located on the surface of pin 10 and rotates about the pin. An annular inner cone bushing 40, seen in more detail in FIG. 3A, is located on the outer surface of each of the sleeve bearings 30. Referring to FIG. 3A (showing components located on the right-hand side of FIG. 3), the inner surface 44 of cone bushing 40 is substantially cylindrical, allowing it to fit in complementary engagement onto the outer cylindrical surface of sleeve bearing 30. The outer surface 45 of the inner cone bushing 40 is frusto-conical and tapers along its axial length, from the outboard side to the inboard side. Thus, the inner cone bushing 40 has a greater thickness on one side than on the axially opposite side. The taper of cone bushing 40 is α degrees, which may vary from 5 to 25, and desirably 15 degrees, in some embodiments, but may be more or less. Inner cup bushing 50 has a substantially cylindrical outer surface 55 and an inner surface 54 having a taper complementary to that of the outer surface 45 of inner cone bushing 40. Thus, it has an inner taper of α degrees, and has a complementary counter-taper to the outer surface 55 of inner cup bushing 50, as seen in FIGS. 3A and 3B. Outer surface 55 may be equipped with grooves 52 to increase friction with the bore of a lug that is mounted to the first embodiment. During fastening, by torqueing a fastener 90 at each end of the assembly, as explained later, the complementary counter-tapers of inner cone bushing 40 and inner cup bushing 50 are urged into engagement. As they are urged into engagement, the inner cone bushing is forced under the inner cup bushing, thus expanding the diameter of the inner cup bushing, which allows it to grip the bore of an attached lug. Inner cup bushing 50 may further have an expansion joint 57 for this purpose.

On the outer (outboard) sides of each of the inner cone bushings 40 and inner cup bushings 50 is a thrust bearing 15, that has a substantially annular shape and that extends around the outer circumference of pin 10. As seen more clearly in FIG. 3A, each of the pair of thrust bearings 15 has a notch 17 of depth h that runs all around one of its circular side surfaces, and that is configured and sized to avoid contact with outer cone bushing 70, thereby minimizing frictional drag on the outer cone-and-cup assembly (discussed below), which is immobile, when the inner cup-and-cone bushing assembly rotates along with sleeve bearing 30 as the male lug rotates. Thrust bearing 15 also interfaces with inner cone bushing 40, and rotates in concert with it. Accordingly, the face of thrust bearing 15 that contacts inner cone bushing 40 may be treated to increase friction and enhance grip between these two components. Annular outer cone bushing 70 is located on the outer surface of pin 10, outboard of the sleeve bearing 30 and the thrust bearing 15, and it is located on the pin's outer surface. Also, because the thrust bearing 15 only interfaces with the outer cup bushing 60, thrust loads are transmitted to the female lug through the shortest and stiffest load path, thus reducing the loads transmitted through the remainder of the outboard assembly which would tend to reduce the clamping friction of the outer cone bushing 70 in the outer cup bushing 60. The outer frusto-conical shaped cone bushing 70 is an annulus that has an inner surface 74 that is cylindrical and sized and configured to fit over the outer surface of pin 10. The inner surface 74 may be treated to increase friction between it and the pin to prevent pin 10 from rotating freely beneath the inner surface 74. As shown in more detail in FIG. 3C, the outer cone bushing 70 has a frusto-conical taper at an angle of β, of between 5 and 25 degrees or more. The outer surface 75 is oriented with the narrow end of the taper inboard from the thicker end of the taper. As shown, the outer cone bushing 70 may include a series of axially extending slots 72, shorter that the axial length of the bushing 70, and extending through the thickness of the bushing and alternating by extending axially from one end, then from the other end of the bushing. In addition, the inner surface 74 of the bushing is offset from the outer surface and the outboard (or thicker) edge of the bushing to form a ring-shaped depression 76 that has an (axial) depth d. The depression 76, of depth d, is sized and configured to receive at least a portion of a leading end 84 of retainer cap 80. When torqueing the fastener, the leading edge 84 engages within the depression 76, and the outer cone bushing is locked into place.

An annular outer cup bushing 60 is located on the outer cone bushing 70 and interfaces with the thrust bearing 15. As shown, in the example, the outer cup bushing 60 has a tapered inner surface 64 at an angle β, selected to match the taper of the outer surface 75 of the outer cone bushing 70. Thus, as in the case of inner bushings 40 and 50, the tapers are complementary and serve the same function of correcting any misalignment as they are urged into engagement by torqueing fastener 90 during assembly. The outer surface 65 of outer cup bushing 60 may include a series of grooves 62, both axial and circumferential, to minimize slippage the bore of a lug. Outer cup bushing 60 may further have an expansion joint 67 to allow for it to expand in diameter and engage the bore of an attached lug.

A retainer cap 80 is fitted onto each of the ends 14 of pin 10. Referring back to FIG. 2, retainer caps 80 are substantially cylindrical and each has an internal surface 82 that is sized and configured to receive one end 14 of the pin 10. Leading edges 84 of cap 80 extend beyond edges 14 of pin 10. Thus, retainer cap 80 receives and encapsulates ends 14 of pin 10. The outer surface 85 of cap 80 includes a through bore 86 forming a connecting passage from the internal to the external side. The through bore 86 has a countersunk head 87 at the outboard end to receive the head of a fastener 90. Moreover, in the example shown, the outer surface 85 is configured to engage a tool, while the fastener 90 is being torqued, to prevent rotation of the entire assembly 100 and permit threadingly driving the fastener 90 into the threaded bore 12 of pin 10 and thereby urging all components into aligned position. Thus, for example, the outer surface 85 has a pair of spaced apart flats 88 that can be gripped by a wrench so that the retainer cap is held immobile, while the fastener 90 is driven by another tool inserted into its socket 96 so that its threaded shank 92 enters the threaded bore 12 of the pin, and the head 94 enters the countersunk portion 87. During torqueing, the inner surface 84 of cap 80 functions as a compression boss urging all the components of the bushing connection system 100 axially. The urging drives the inner cone-and-cup bushings into complementary counter-tapered engagement, and the outer cone-and-cup bushings into complementary counter-tapered engagement. As the cone-and-cup bushings are urged into alignment, their external diameters increase thereby gripping the bores of the lugs that are being mounted. Torqueing (and urging) is continued until the rotary bushing connection system is fully aligned and secured in place. At that stage, a locking pin 95 is inserted through a radially extending bore in cap 80 (not shown) and through a bore 98 in fastener 90, when these bores are lined up into registration with each other.

Figure 4:
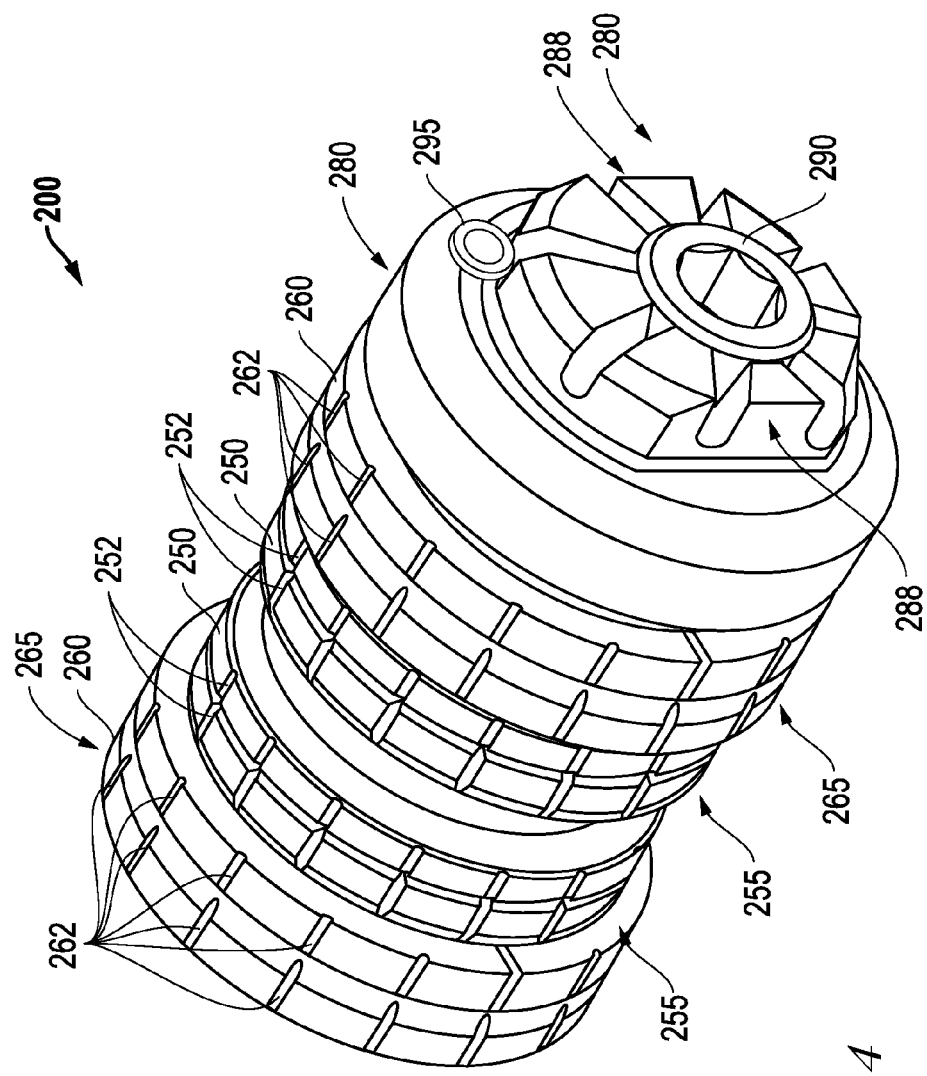
FIG. 4 is an illustration depicting a second exemplary embodiment of the misalignment-compensating rotary bushing connection system.
Figure 5:
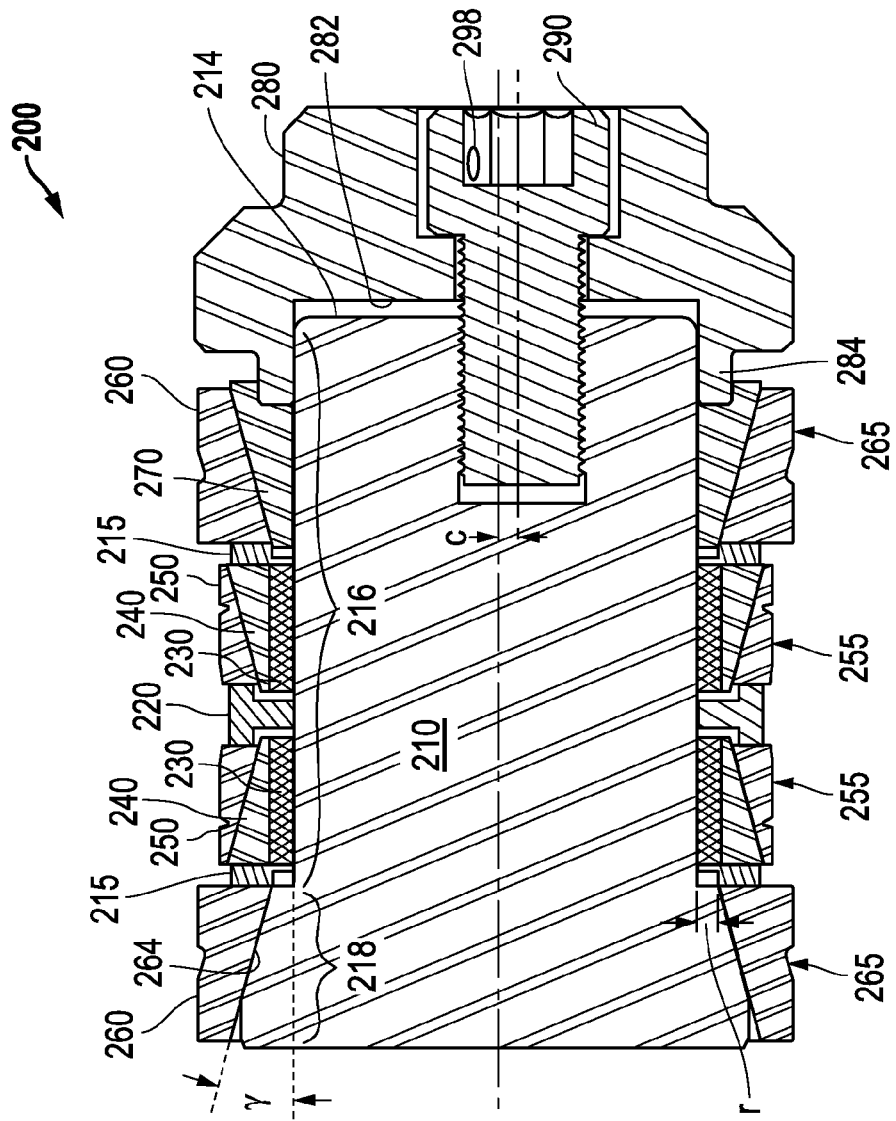
FIG. 5 is a cross sectional view of the second embodiment.
Figure 6:
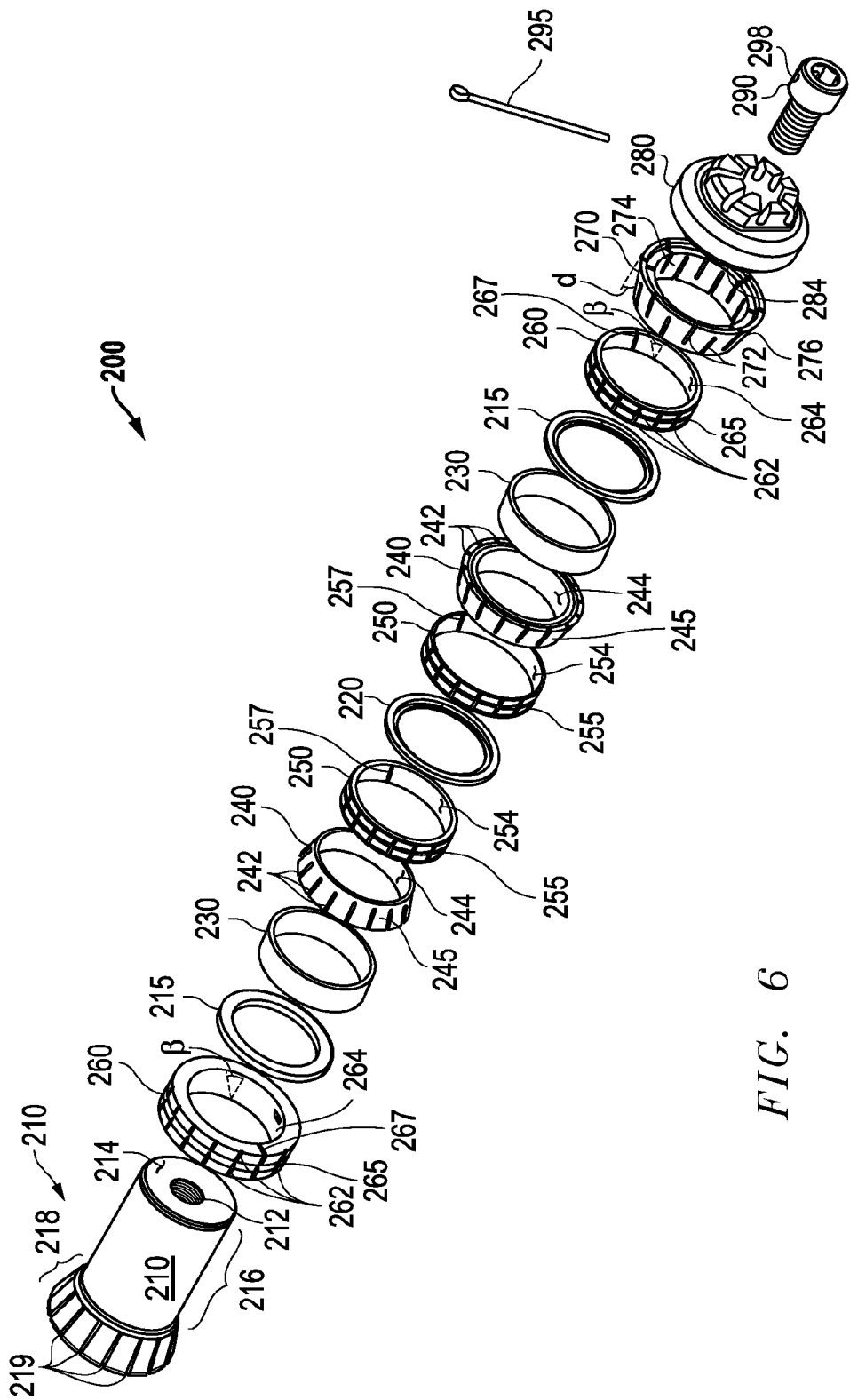
FIG. 6 is an exploded view showing detail of the components of the second embodiment.

A second exemplary embodiment 200 of the misalignment-compensating rotary bushing connection system, one having only a single retainer cap, and thus allowing use in situations where both sides of the assembly cannot be reached, is shown in FIGS. 4, 5, and 6. In the second embodiment 200, a central rotatable lug or lugs may be mounted to surfaces 255, while immobile lugs may be mounted to surfaces 265. The second embodiment 200 has a pin 210 that has a threaded bore 212 at only one end 214. The pin 210 has a substantially cylindrical first section 216 and a second section 218 that is substantially frusto-conical. The second section 218 has a cross sectional diameter increasing with distance from the first section 216. The taper angle of the outer surface γ may be from 5 to 25 degrees, and preferably 15 degrees, but may be greater or less. And, the second section 218 is separated from the first section 216 by a ledge having a radial depth r. The radial depth r, in the example shown, approximates the thickness of the sleeve bearings 230. The outer surface of the second section 218 may be supplied with grooves 219. The end 214 of the first section 216 has a threaded bore 212 that may be off-center by an amount c as shown. In addition, the circumferential edges at end 214 of pin 210 are chamfered, for example, at an angle of about 45 degrees, or a larger or smaller angle.

In the illustrated embodiment, an annular central spacer 220 is located on the first section 216 of pin 210, and is located on the circumference of pin 210. Spacer 220 is flanked on each side by an annular sleeve bearing 230 that is located on the surface of pin 210, and is located on the circumference of pin 210. Annular sleeve bearing 230 rotates about the pin 210. An annular inner cone bushing 240 is located on the outer surface of each of the sleeve bearings 230, and fits snugly on the outer surface of the sleeve bearings 230. The inner surface 244 of cone bushing 240 is substantially cylindrical to fit tightly onto the outer cylindrical surface of sleeve bearing 230. But, the outer surface 245 of the inner cone bushing 240 tapers from the outboard side of the annular shape to the inboard side, so that the inner cone bushing 240 has a greater thickness on one side than on the axially opposite side. The taper of cone bushing 240 is $\alpha$ degrees, which may vary from 5 to 25, and desirably 15 degrees, in some examples, but may be more or less. Inner cup bushing 250 is substantially annular in shape and has an inner surface 254 that has a taper complementary to that of inner cone bushing 240. Thus, it has an inner taper of $\alpha$ degrees. The outer surface 245 of inner cup bushing 240 is substantially cylindrical in shape and may be equipped with axial and circumferential grooves 242 to increase friction with an attached lug. During fastening, by torqueing a fastener 290, the complementary counter-tapers of the inner cone and inner cup bushings are urged into engagement and this engagement facilitates correcting for any misalignment by re-aligning components. Inner cup bushing 250 may further have an expansion joint 257 to allow its diameter to expand and engage the bore of an attached lug during assembly.

On each side of the inner cone bushings 240 and inner cup bushings 250 is a thrust bearing 215 that has a substantially annular shape that extends around the outer circumference of the first section 216 of pin 210. Each thrust bearing has a notch that runs all around one of its circular side surfaces, and that is configured to avoid contact with outer cone bushing 260 or the second section 218 of pin 210, thereby minimizing frictional drag on the outer assemblies, which are immobile, when the inner cup-and-cone bushing assembly rotates along with sleeve bearing 230 about the pin. Thrust bearing 215 also interfaces with inner cone bushing 240, and rotates in concert with it. Accordingly, the interface of thrust bearing 215 with inner cone bushing 240 may be treated to increase friction and enhance grip between these two components. Similarly, the interface between thrust bearings 215 and outer cup bushings 260 may be treated to reduce friction and increase slippage to reduce drag from the rotating components. Also, because the thrust bearing 215 only interfaces with the outer cup bushing 260, thrust loads are transmitted to the female lug through the shortest and stiffest load path, thus reducing the loads transmitted through the remainder of the outboard assembly which would tend to reduce the clamping friction of the outer cone bushing 270 in the outer cup bushing 260.

Unlike the first embodiment 100, the second embodiment 200 only requires a single annular outer cone bushing 270 because the frusto-conical section 218 of pin 210 performs the function of a second outer cone bushing. As such, only a single outer cone bushing 270 is located on the outboard side of the thrust bearing 215 that is farthest from section 218. Outer cone bushing 270 is located on the pin's outer surface and may be treated to maximize friction with the pin's surface to prevent the pin from sliding freely, so that an attached lug remains immobile. The outer cone bushing 270 is a frusto-conical-shaped annulus that has an inner surface 274 that is cylindrical and sized and configured to fit over the outer surface of pin 210. The outer surface 275 of outer cone bushing 270 has a taper at an angle of $\beta$, of between 5 and 25 degrees or more. The outer surface 275 is oriented with the thicker end of the taper nearer to the end 214 of pin 210. As shown, the outer cone bushing 270 may include a series of slots 272 extending through the thickness of the bushing and alternating by extending axially from one end, then from the other end of the bushing. The slots 272 are shorter than the axial length of the bushing 270. In addition, the inner surface 274 of the bushing is offset from the outer surface 275 at the thicker edge of the bushing by a circumferentially extending ring-shaped depression 276 that has an (axial) depth d. The depression 276 of depth d is sized and configured to receive at least a portion of a leading end 284 of retainer cap 280. When torqueing the fastener 290, the leading edge 284 engages within the depression 276.

On the side of the inner cone bushing 240 that is located farthest from end 214 of the pin, and nearest to the second section 218 of the pin, as indicated above, is a thrust bearing 215, which is separated from the ledge that separates the first section 216 from the second section 218 of pin 210. The second section 218 of pin 210 has an outer surface that tapers at an angle $\gamma$ and it is surrounded by an annular outer cup bushing 260 that has an inner surface 264 tapered at a like angle. The outer surface 265 of the outer cup bushing 260 may be cylindrical, and may be supplied with grooves 262 to increase friction with the bore of a lug. The inner surface 264 of the outer cup bushing may also be treated to increase friction and decrease slippage. Outer cup bushing 260 may further have an expansion joint 267 to allow for it to expand in diameter and engage the bore of an attached lug.

A retainer cap 280, like that described for the above exemplary embodiment, or one of a different design, may be fitted onto end 214 of pin 210. During torqueing, the inner surface 284 of cap 280 functions as a compression boss urging all the components of the bushing assembly 200 axially toward the farther end of second section 218. The urging forces the inner cone-and-cup bushings into complementary tapered engagement, and the outer cone-and-cup bushings into complementary tapered engagement. This causes the cone-and-cup bushings' diameters to increase. Torqueing (and urging) is continued until the rotary bushing assembly is fully aligned and secured in place. At that stage, a locking pin 295 is inserted through a radially extending bore in cap 280 (not shown) and through a bore 298 in fastener 290, when these bores are lined up into registration with each other.

Figure 7:
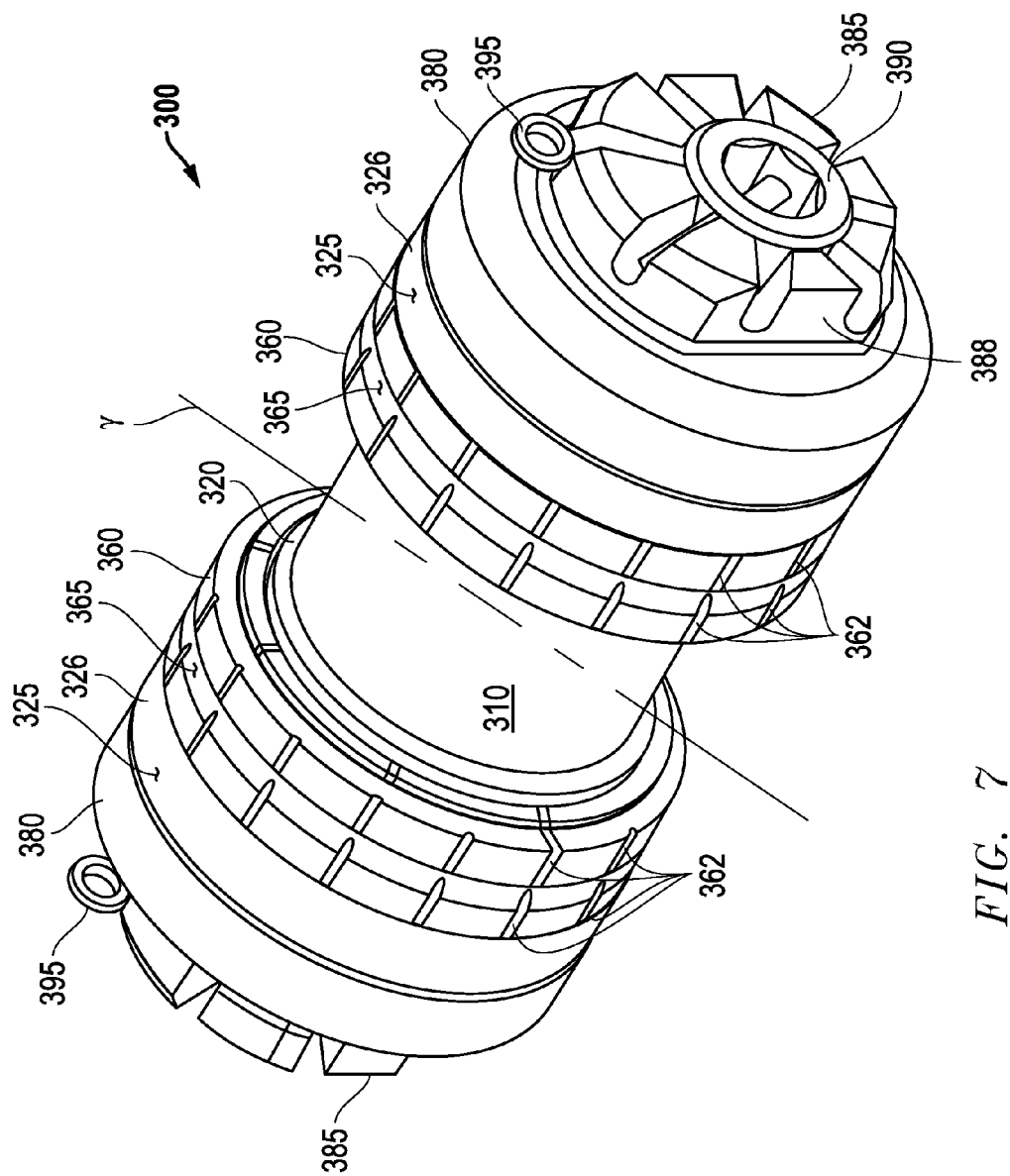
FIG. 7 is an illustration depicting a third exemplary embodiment of the misalignment-compensating rotary bushing connection system.
Figure 8:
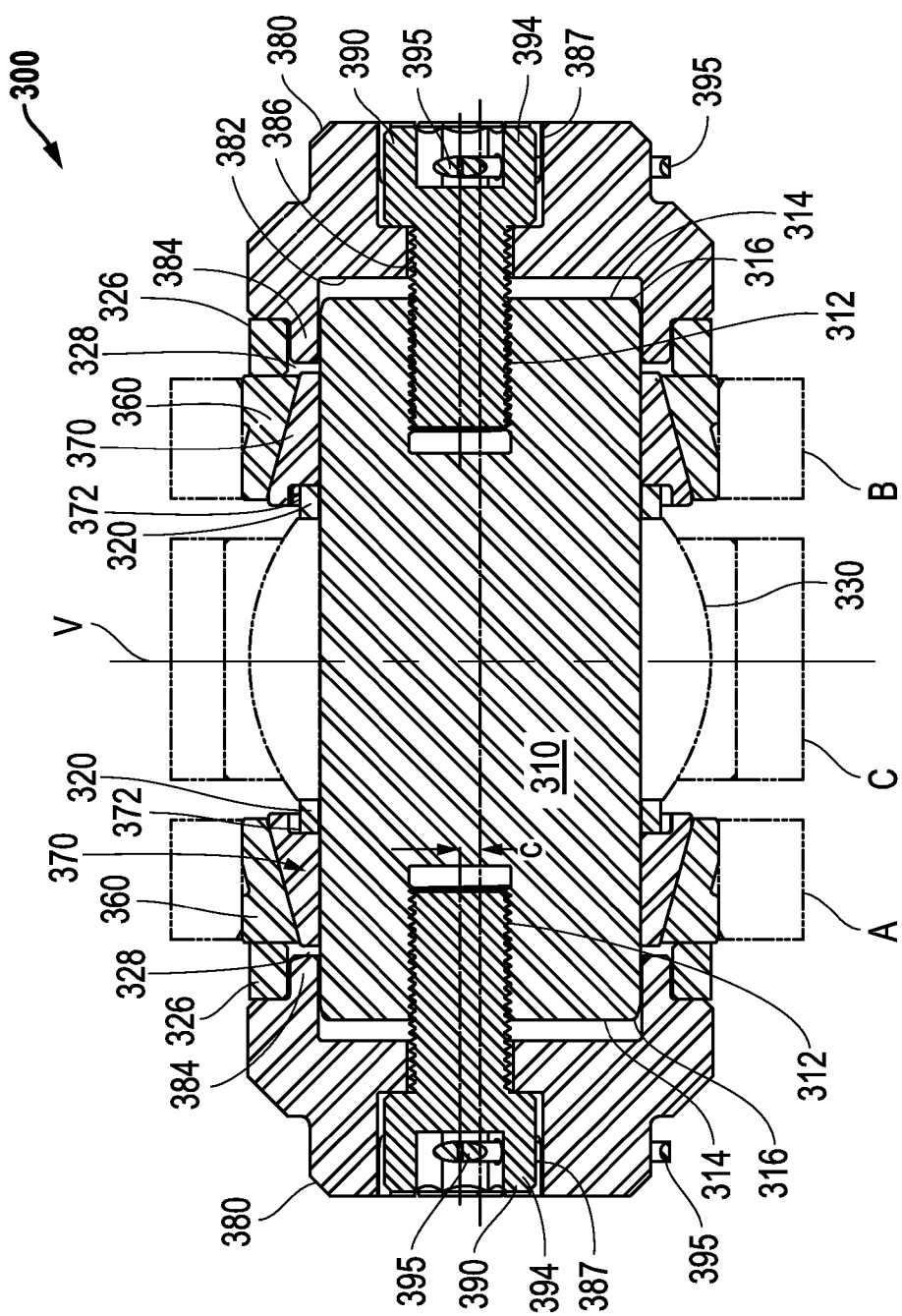
FIG. 8 is a cross sectional view of the third embodiment.
Figure 9:
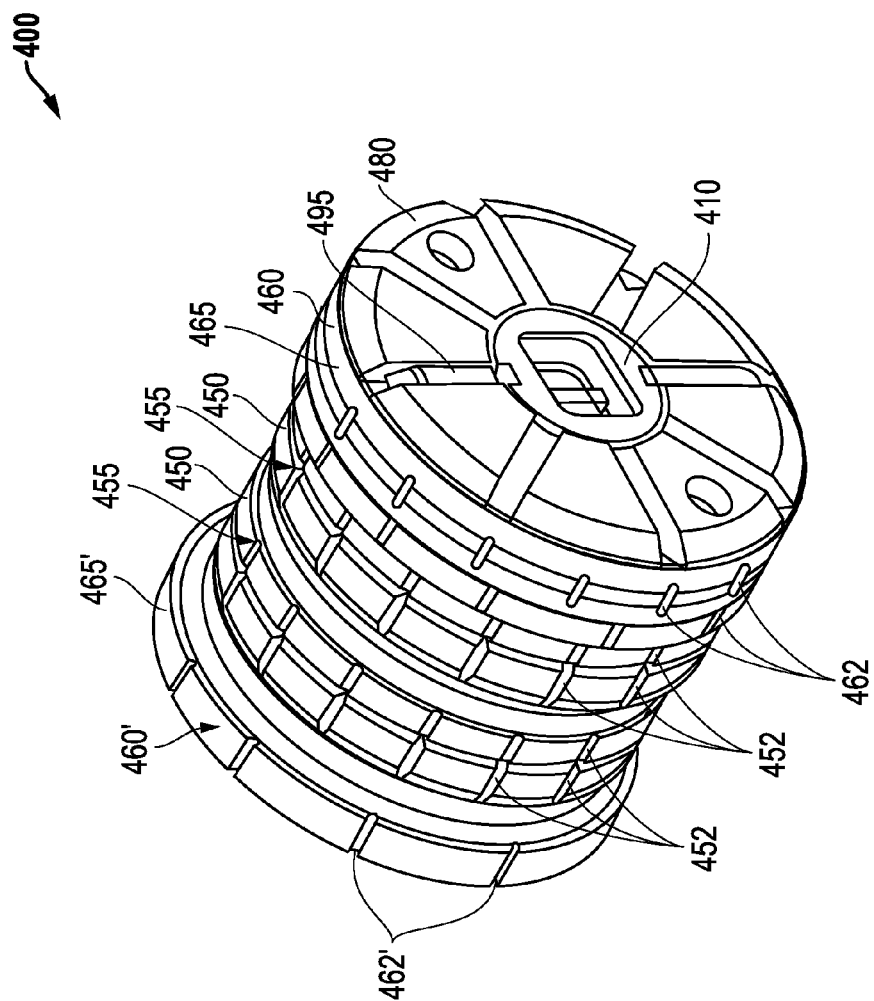
FIG. 9 is an illustration depicting a fourth exemplary embodiment of the misalignment-compensating rotary bushing connection system.

A third exemplary two-ended embodiment 300 of the misalignment-compensating rotary bushing connection system is illustrated in FIGS. 7 and 8. The embodiment is symmetrical about a central vertical axis V. In this exemplary embodiment of the rotary misalignment-compensation bushing connection system 300, a central pin 310 passes through a first outer lug A, and a second outer lug B, as well as a central lug C, that is equipped with a bearing 330, in this example shown as a spherical bearing. The exemplary embodiment compensates for any misalignment and provides appropriate alignment between the three lugs, A, B and C. Lugs A and B are immobile relative to the pin, while lug C moves about the pin. The central cylindrical pin 310 has a pair of ends 314, that each has a chamfered circumferential edge, and a threaded off-center hole 312 for receiving a threaded shank of a fastener 390. The bearing 330 is centered along the axis of pin 310 and is flanked by annular spacers 320 located on the pin 310. Each of the spacers 320 is in turn flanked on the outboard side by an axially-tapered annular cone bushing 370. The cone bushings 370 have tapered exterior surfaces. Interior surfaces of the cone bushings 370 may be treated to increase friction and prevent slippage with the surface of the pin such that the pin rotates in concert with the attached lugs A and B. The cone bushings 370 are oriented with the thicker end of the taper inboard. The thicker end has a circumferentially extending notch 372 that is configured and sized to receive a portion of spacer 320 when the bushing connection system is assembled, but is able to slip over the surface of spacer 320. An annular cup bushing 360 is located on each of the cone bushings 370. The cup bushings 360 have interior surfaces that are tapered at a counter-taper to that of the outer surfaces of the cone bushings 370. During torqueing of the fastener 390, as in other embodiments described above, the surface 384 of cap 380 functions as a compression boss urging all the components of the bushing assembly 300 axially together such that the complimentary counter-tapers of the cone and cup bushings 360 and 370 become engaged and thereby correct for any component misalignment. The cup bushing (similar to the above described outer cup bushings) may have an expansion joint to allow its diameter to expand during assembly and thereby urge against the bore of an attached lug. The angle of taper α of the bushings may range from 5 to 25, and desirably 15 degrees, but may be more or less. The outer surface 365 of each cup bushing 360 may be provided with grooves 362, depicted as axial and radial grooves in this example. A pair of outer spacers 326 are located outboard of each of the cup bushings 360. These annular spacers 326 have an inner diameter less than that of the compression boss 384, but greater than that of pin 310 such that it does not interface with cone bushing 370. As such, the spacer 326 is sized and configured to receive the leading edge 384 of the retainer cap 380, when the assembly 300 is urged together by torqueing the fastener 390, and to transfer forces axially along the assembly of components.

A retainer cap 380, like that described for the above exemplary embodiment, or one of a different design, may be fitted onto ends 314 of pin 310. During torqueing, the inner surfaces 384 of caps 380 function as a compression boss urging all the components of the bushing assembly 300 axially toward the axis V. As explained above, the retainer cap 380 may be gripped by a wrench or other tool at opposed flats 388 such that a fastener 390 can be threaded into end hole 312 and the head 394 of the fastener is drawn into the countersunk bore 387 of the retainer cap. The offset c in the threaded bore 312 permits the bushing assembly 300 to be immobilized in such a manner. Torqueing (and urging) is continued until the rotary bushing assembly 300 is fully aligned and secure in place. At that stage, a locking pin 395 is inserted through a radially extending bore in cap 380 (not shown) and through a bore 398 in fastener 390, when these bores are lined up into registration with each other.

A fourth exemplary embodiment 400 of the misalignment-compensating rotary bushing connection system is illustrated in FIGS. 9, 10, and 11A-11E. Reference to "inboard" and "outboard" with regard to this embodiment refers to proximity to the spacer 420.

The fourth embodiment 400 compensates for any misalignment and provides appropriate alignment between the three lugs, A, B and C. Lugs A and B are immobile with respect to pin 410, while lug C rotates about pin 410. The central pin 410 has a first section 416 and a second section 418. Section 416 is cylindrical, and section 418 is frusto-conical, tapered at an angle β, with a larger diameter end being outboard. At the intersection of the first and second sections 416 and 418 is a ledge of radial depth l. As a result of the depth l of the ledge, thrust bearing 415 avoids contact with pin 410 at that point, as explained later. At the opposite end to end 415 of pin 410, there is a central boss 414 of smaller diameter than pin section 416, and that has external threading. In this embodiment, the central boss 414 of the pin extends farther out than the peripheral ends 412 of the pin. However, in alternate embodiments, the peripheral ends 412 may extend beyond the central boss 414 or to the same length as the central boss 414. The threaded boss 414 is used in assembling the connection system, as explained here below.

Approximately at the axial center of the exemplary embodiment is a spacer 420. The spacer is flanked by a pair of sleeve bearings 430 that are located on the pin 410 and that rotate about the pin.

An annular inner cone bushing 440 is located on the outer surface of each of the sleeve bearings 430, and moves with the sleeve bearing. The inner surface of cone bushing 440 is substantially cylindrical allowing it to fit in complementary engagement onto the outer cylindrical surface of sleeve bearing 430, such that the two move in concert. The outer surface of the inner cone bushing 440 is frusto-conical and tapers along its axial length, from one side to the other side. Thus, the inner cone bushing 440 has a greater thickness on one side than on the axially opposite side. Inner cone bushing 440 has a taper of α degrees, which may vary from 5 to 25, and desirably 15 degrees, in some examples, but may be more or less. Inner cup bushing 450 has a cylindrical outer surface 455 and an inner surface having a taper complementary to that of the outer surface of inner cone bushing 440. Thus, it has an inner taper of α degrees. Outer surface 455 may be equipped with grooves 452 to minimize slippage across the surface. During assembly, as explained later, the complementary counter-tapers of inner cone bushing 440 and inner cup bushing 450 are urged into engagement and the outer diameter expands and urges against the bore of attached lug C. Thereby, this engagement facilitates correcting for any misalignment by re-aligning components.

On each of the outboard sides of the inner cone bushings 440 is a thrust bearing 415, that has a substantially annular shape and that extends around the outer circumference of the first section 416 of pin 410. Each thrust bearing has a notch that runs all around one of its circular side surfaces, and that is configured and sized to receive therein a tapered end of an outer cone bushing 470, and such that a smooth outboard face of the bearing slides against outer cup bushings 460 and 460'.

An annular frusto-conical outer cone bushing 470 is located on the outer surface of the first section 416 of pin 410, and has an inner surface that may maximize friction and prevent slippage with the pin. The outer cone bushing 470 has an inner surface that is cylindrical and sized and configured to fit onto the outer surface of pin 410. The outer surface of outer cone bushing 470 has a taper at an angle of β, of between 5 and 25 degrees, desirably 15 degrees, but may be more or less. The outer surface 475 is oriented with the thicker end of the taper outboard. The outer cone bushing 470 may include a series of slots extending through the thickness of the bushing and alternating by extending axially from one end, then from the other end of the bushing. The slots are shorter than the axial length of the bushing.

An annular outer cup bushing 460 is located on the outer cone bushing 470. The outer cup bushing 460 has a cylindrical outer surface 450 and an inner surface that tapers at an angle α that is complementary to the outer surface taper of outer cone bushing 470. The outer cup bushing 460 may have an expansion joint to permit its diameter to expand during assembly.

Another annular outer cup bushing 460' is located on the outer surface of section 418 of the pin 410. The outer surface of pin section 418 may be grooved, and is tapered at an angle β. The inner surface of outer cup bushing 460' matches that taper angle such that the two surfaces are in complementary engagement when the cup bushing 460' is located on the pin section 418. Taper angle β may vary from 5 to 25 degrees, desirably 15 degrees, but may be more or less. The outer surface 465' of the cup bushing 460' may be provided with grooves 462', as illustrated, to minimize slippage with an attached lug. The outer cup bushing 460' may have an expansion joint to permit its diameter to expand during assembly.

Figure 10:
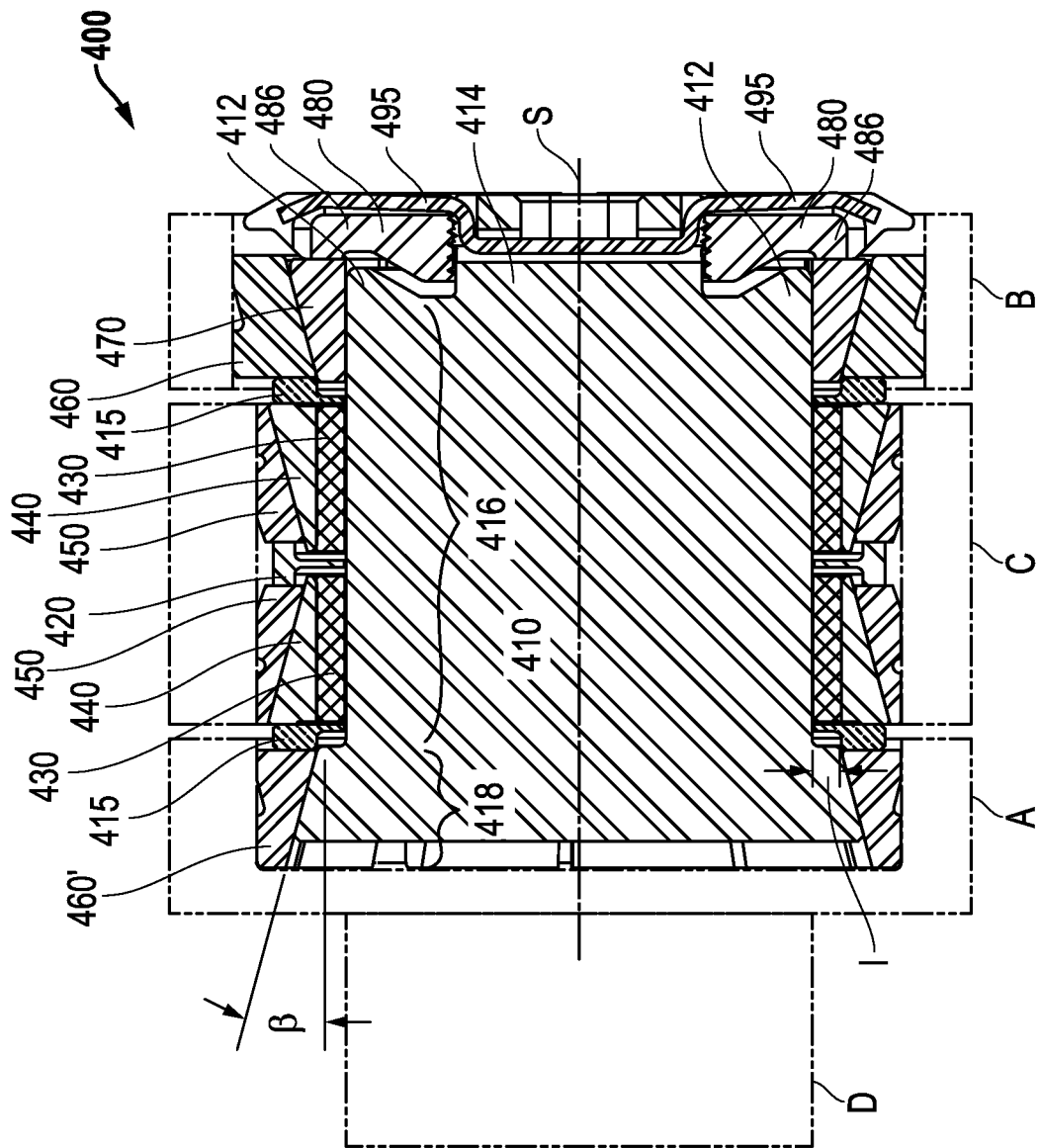
FIG. 10 is a cross sectional view of the fourth exemplary embodiment.
Figure 11A:
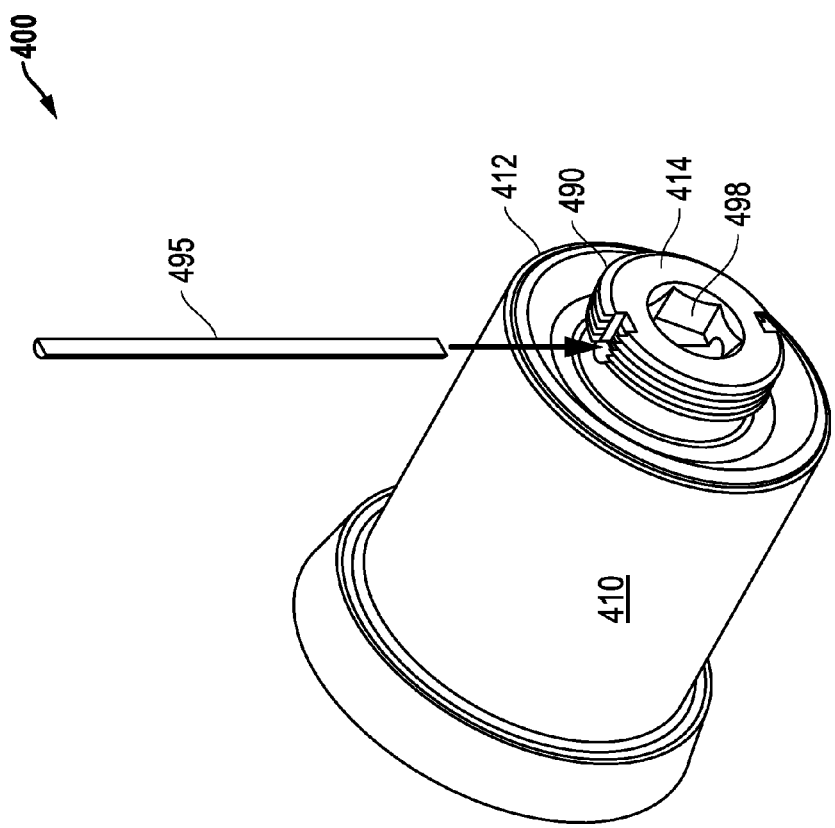
FIGS. 11A-11E illustrate in more detail the assembly of a retainer cap of the fourth embodiment.
Figure 11B:
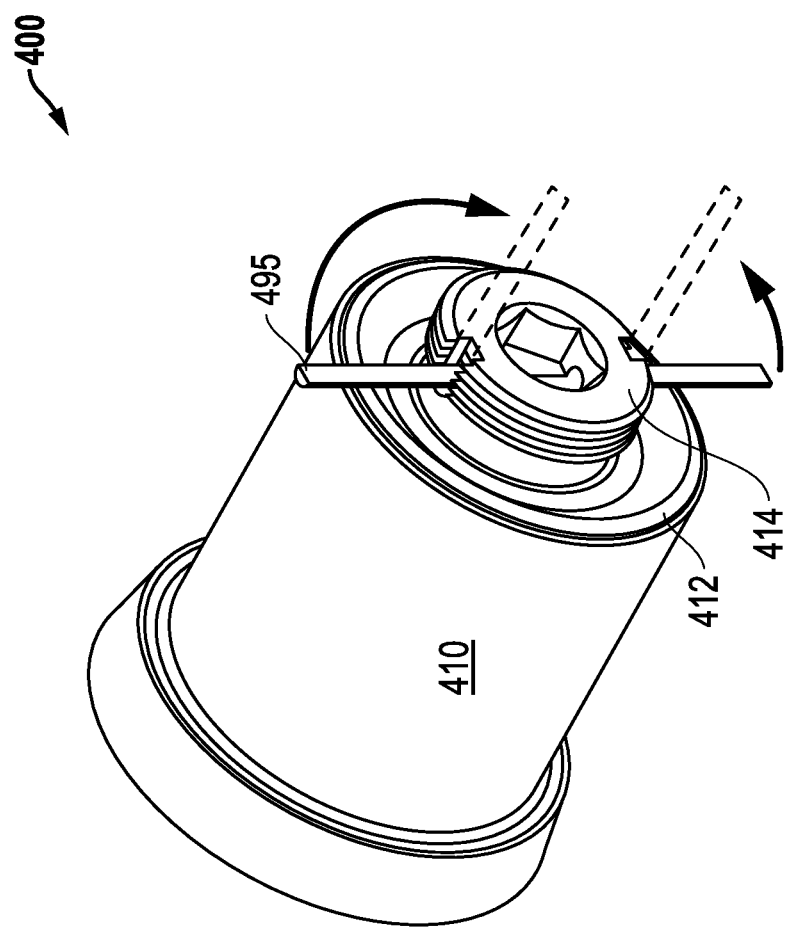
Figure 11C:
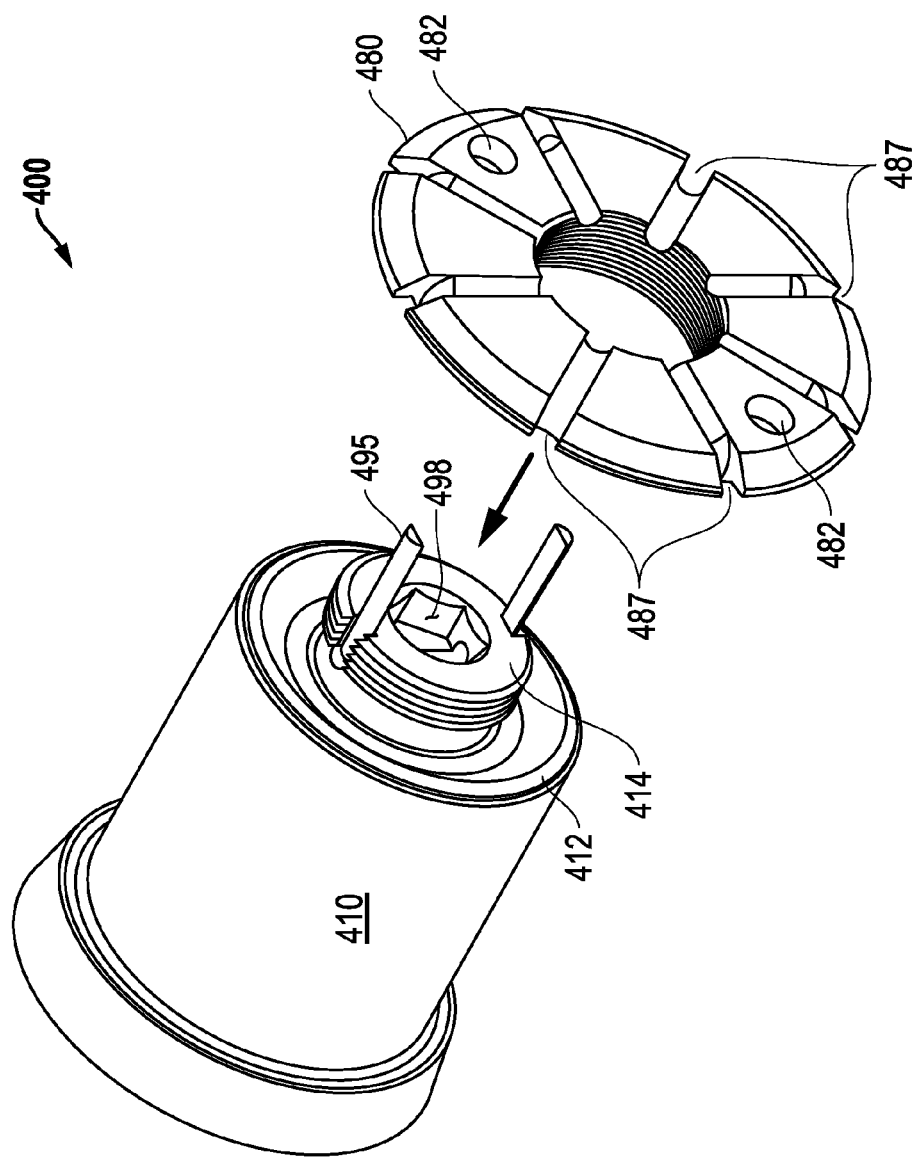
Figure 11D:
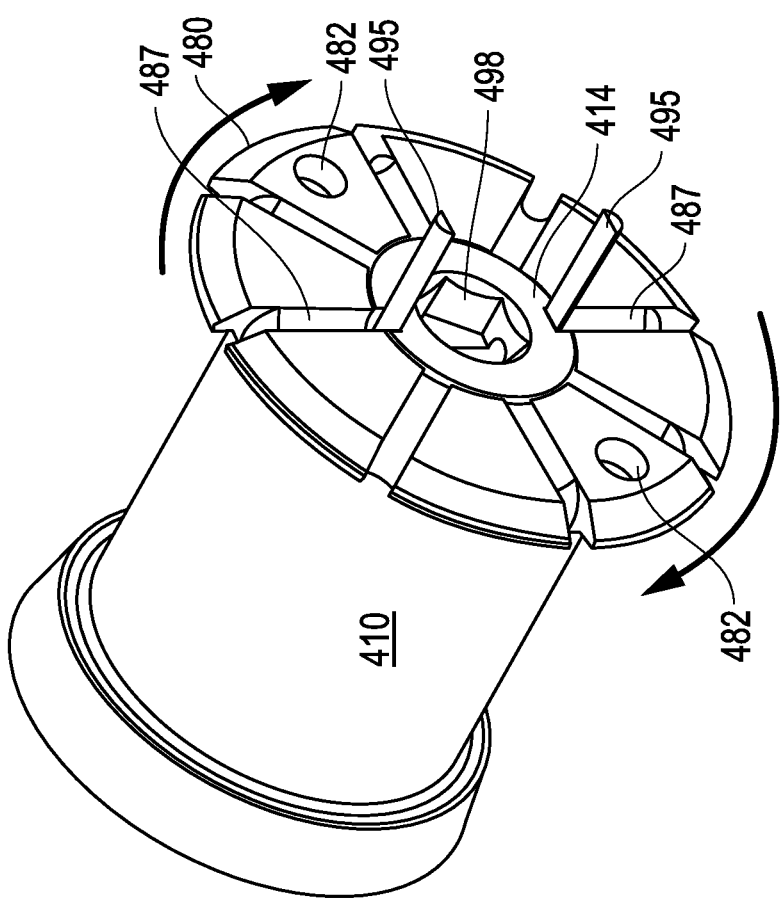
Figure 11E:
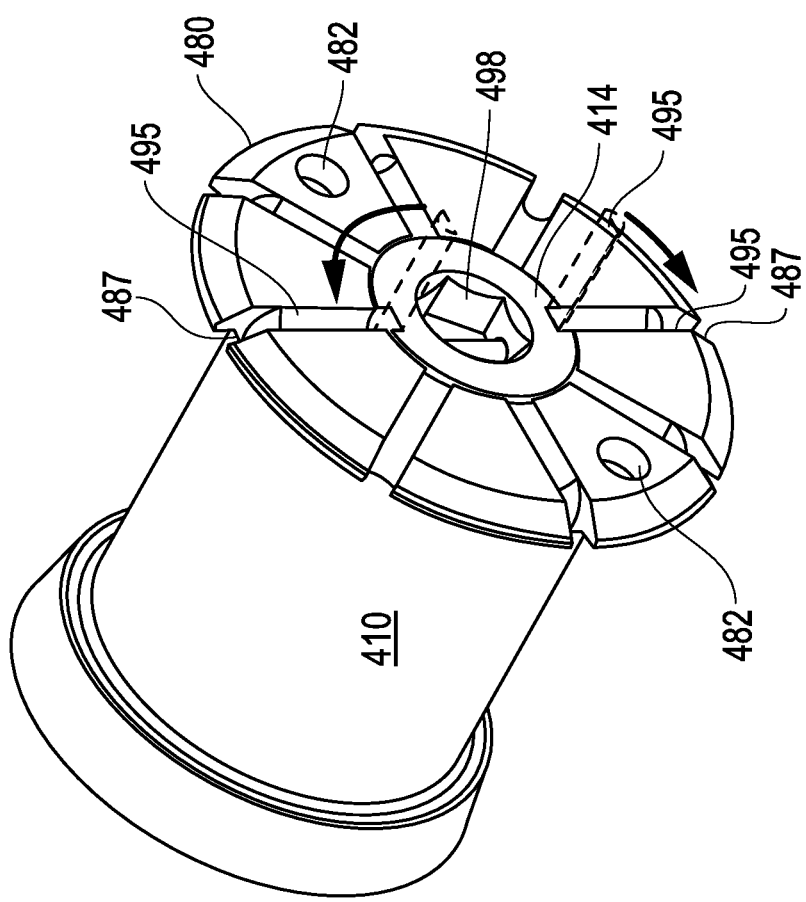

FIGS. 11A-11E illustrate in more detail the steps of assembling the fourth embodiment 400, in particular assembly of retainer cap 480. First, inboard components are located onto pin 410 starting with the outer cup bushing 460' and ending with outer cup bushing 460 and outer cone bushing 470 (as shown in FIG. 10). These inboard components have been omitted from FIGS. 11A-E for clarity. Next, a cotter pin 495 is inserted into a bore 490 in the central boss 414 of pin 410 as shown by the arrow in FIG. 11A. The ends of the cotter pin 495 are bent at a 90 degree angle as shown in FIG. 11B by the arrows. Alternatively, the inboard components may be located onto the pin after the cotter pin has been bent. Next, a retainer cap 480 having an inner-threaded, central-through hole is threaded onto the central boss 414 of pin 410 (see FIG. 11C). The pair of ends of the cotter pin 495 extends outward through the central hole in retainer cap 380.

During assembly, the retainer cap 480 is initially partially-threaded onto the boss 414 as is explained in more detail below. This can be done by hand. Then, the untightened, misalignment-compensation system 400 may be inserted into lugs A, B, and C. Then retainer cap 480 may be fully tightened by inserting a fastening tool into socket 498 of central boss 414 of the pin to torque pin 410 while retainer cap 480 may be gripped immovably using a tool (e.g., a spanner wrench) that inserts into holes 482 (see FIG. 11D). Alternatively, pin 410 may be gripped immovably while retainer cap 480 is torqued. During this torqueing, the peripheral inner surface 486 of the retainer cap 480 acts as a compression boss to push axially against outer cone bushing 470 (see FIG. 10). This axial pushing urges the complementary tapers of the assembled cone-and-cup bushings into alignment, which cause their exterior diameters to expand and urge against the bores of the lugs A, B, and C. Once embodiment has been torqued such that the assembly is complete, the ends of cotter pin 495 are bent backward at 90 degrees to fit within any pair of opposed slots 487 on the exterior surface of retainer cap 480 as shown by the arrow in FIG. 11E. Thus, retainer cap 480, which is threaded to central boss 414 of the pin, is secured and neither can rotate independently of the other. That is, retainer cap 480 is threaded to pin 410 and cannot be removed from the pin without first straightening the ends of cotter pin 495 and unthreading retainer cap 480.

Figure 12A:
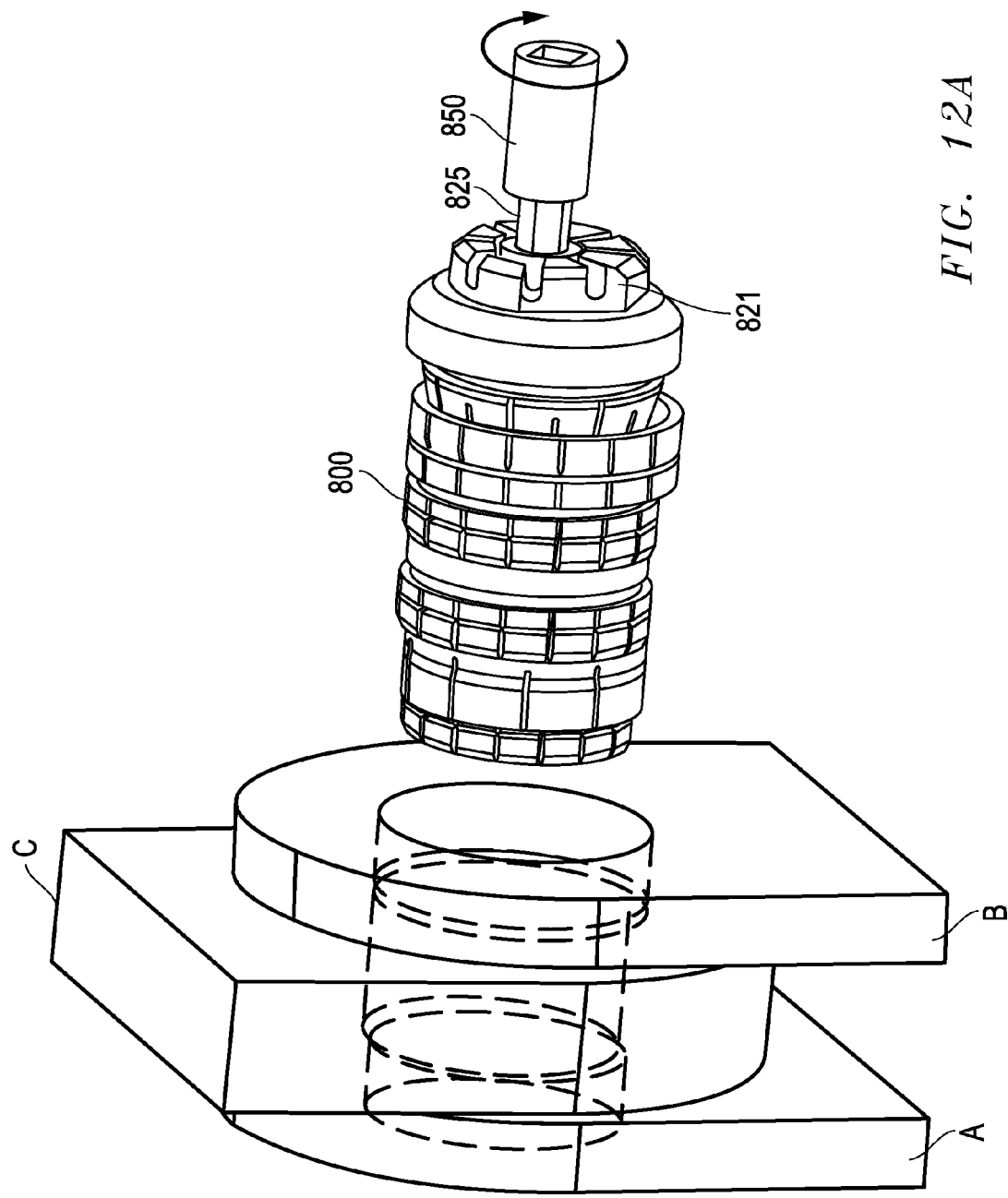
FIGS. 12A-12D illustrate in more detail an exemplary embodiment of the misalignment-compensating rotary bushing connection system being inserted from one end of a series of lugs and tightened from one end to affix the embodiment in position.
Figure 12B:
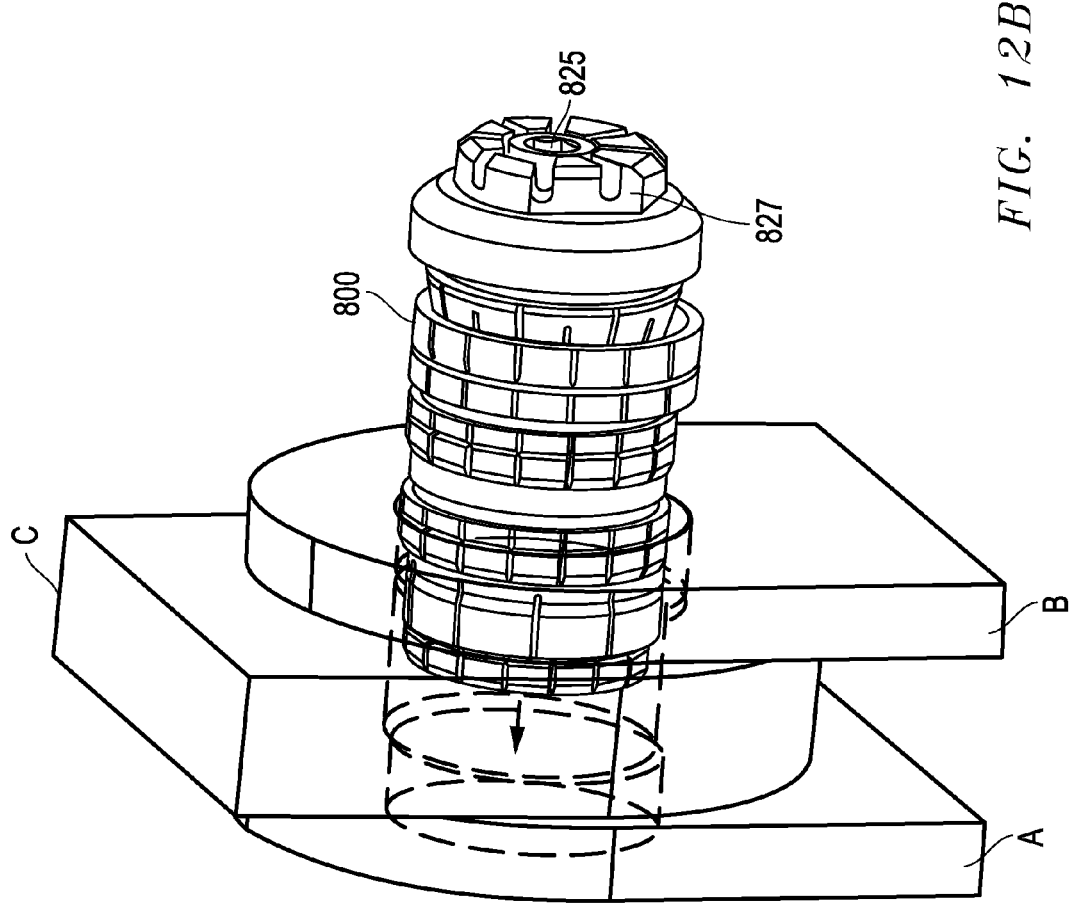
Figure 12C:
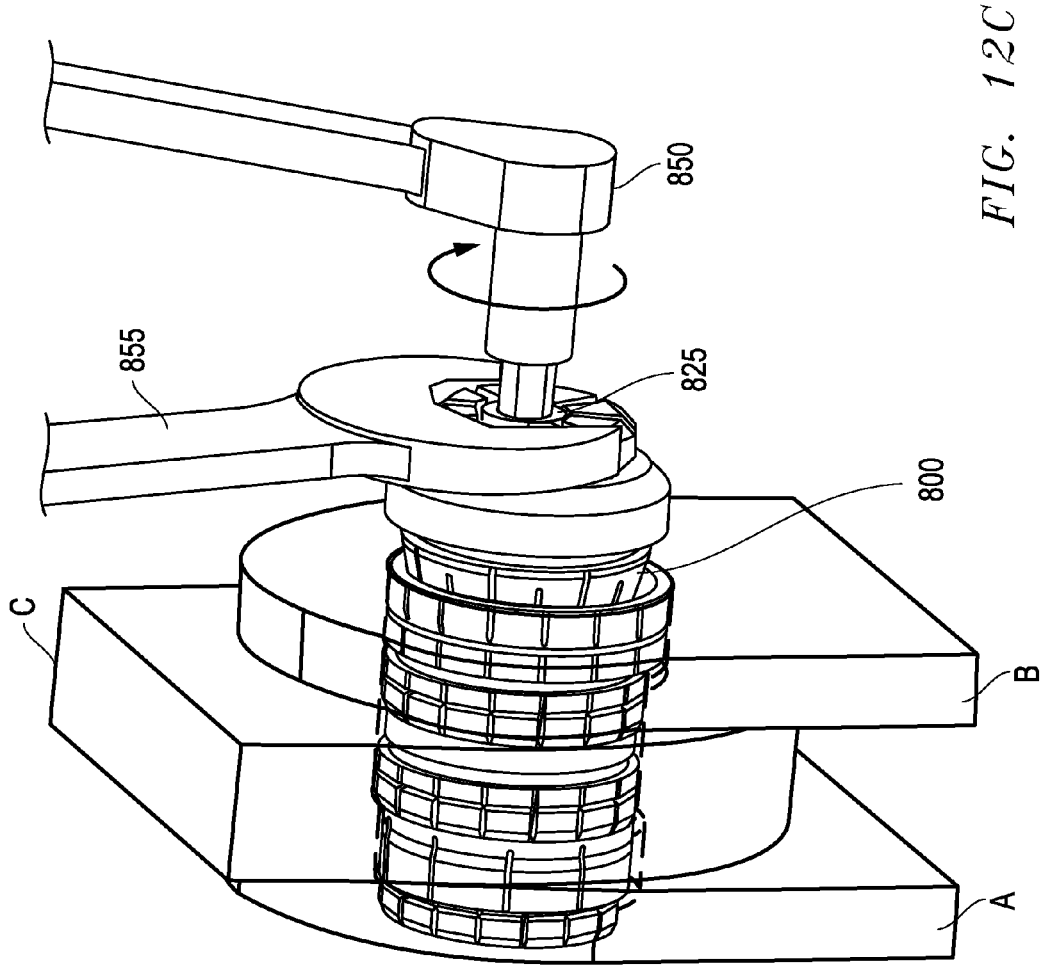
Figure 12D:
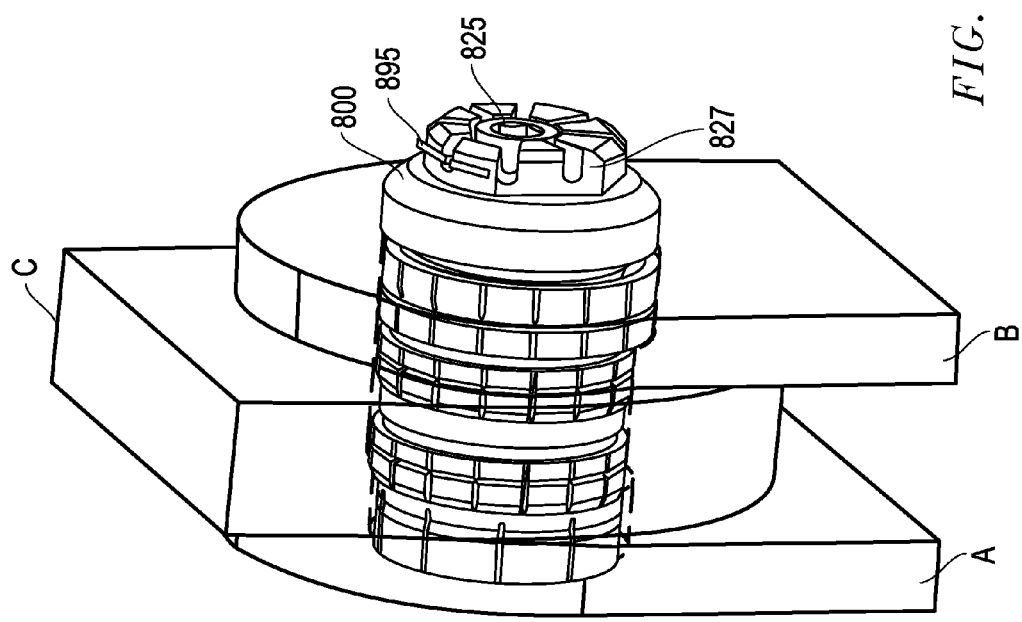

FIGS. 12A-12D depict an exemplary method for assembling an exemplary embodiment 800 of the rotary misalignment-compensation bushing connection system. Exemplary embodiment 800 depicted in FIGS. 12A-12D is substantially identical to the second embodiment 200 disclosed above. A fastening tool 850 is inserted into socket 825 of exemplary embodiment 800 and is used to partially fasten the exemplary embodiment (see FIG. 12A). In this position, the components of exemplary embodiment 800 are loosely engaged and have their smallest exterior diameter. It is clear that the largest diameter of embodiment 800 (when not fully-fastened) must be less than the smallest bore of the lugs when the exemplary embodiment 800 is being inserted. Next, the partially-tightened embodiment 800 is inserted into a series of lugs, A, B, and C, as illustrated in FIG. 12B. Once embodiment 800 is approximately in place, it may be fully-torqued from one side using a fastening tool 850 to torque the socket 825 while another tool (e.g., a wrench) engages the pair of spaced flats 827 of the retainer cap of the exemplary embodiment 800 (see FIG. 12C). Alternatively, in lieu of partially-tightening and inserting, the pin of embodiment 800 may first be inserted into the bore of the lugs, then the components may be placed on to the pin, and then the embodiment may be fully-tightened. Because the threaded hole of the pin of exemplary embodiment 800 is offset from center by a distance c (see FIG. 2), the pin may be rotationally immobilized by immobilizing the retainer cap using a tool as shown in FIG. 12C. As exemplary embodiment 800 is torqued, small errors in the alignment of the lugs (even up to $\frac{1}{8}^{th}$ inches in assemblies with pin diameters up to 4 inches, and more in larger sizes) are corrected as the various components are urged into their proper locations. During torqueing of the socket, the components of exemplary embodiment 800 are urged together and the diameter of the embodiment 800 expands slightly, as axial components are brought into overlapping alignment and complementary tapers are engaged. This radial expansion is sufficient for the appropriate surfaces of embodiment 800 to engage the surfaces of the bores of the lugs and prevent the exemplary embodiment and the lugs from disengaging. Finally, a locking pin 895 may be inserted to lock the embodiment (see FIG. 12D). Similarly, the other embodiments of the rotary misalignment-compensation bushing connection system disclosed and claimed herein may be assembled and engaged as is apparent to one of ordinary skill in the art.

While examples of embodiments of the rotary misalignment-compensation bushing connection system have been presented and described in text and, in some examples, also by way of illustration, it will be appreciated that various changes and modifications may be made in the described rotary misalignment-compensation bushing connection system and its components without departing from the scope of the invention, which is set forth in, and only limited by, the scope of the appended patent claims, as properly interpreted and construed.

The invention claimed is:

1. A rotary misalignment-compensation bushing connection system for preloaded connection of a male lug rotatably mounted between a first lug and a second lug, the bushing connection system comprising:

a substantially cylindrical pin having opposed first and second ends, the pin configured to fit within an orifice in each of the first and second lugs and the male lug, such that the male lug rotates about the pin;
a first axial threaded hole in the first end of the pin;
a center spacer located substantially centered on the pin in a non-interfering fit;
a pair of sleeve bearings, one each being located on the pin on each side of the center spacer;
the sleeve bearings being located on the pin;
an inner cone bushing located on each sleeve bearing in interference fit;
an inner cup bushing located on each inner cone bushing;
a pair of thrust bearings located on the pin, on an end of the inner cone bushing opposite to the center spacer;
an outer cone bushing located on and surrounding the pin, the outer cone bushing adjacent to one of the thrust bearings;
an outer cup bushing located on top of and surrounding the outer cone bushing;
the center spacer being axially preloaded between the inner cup bushings;
the thrust bearings being rotatable and axially preloaded against the outer cup bushing;
a retainer cap having an internal side and an external side, and a connecting passage from the internal to the external side;
the internal side having a compression boss engageable with the outer cone bushing, and a relief receivable of the first end of the pin having the threaded hole; and,
the external side configured to engage a fastening tool, and having a radial slot or bore receivable of a locking pin.

2. The bushing connection system of claim 1, wherein the outer cup bushing is located at a portion of the pin closest to the first end.

3. The bushing connection system of claim 1, wherein the pin comprises a first portion and a second portion, the second portion is substantially frusto-conical in shape, with cone diameter increasing with distance from the first portion, the second portion separated from the first portion by a ledge having a radial depth.

4. The bushing connection system of claim 3, wherein an outer thrust bearing is located adjacent the ledge and adjacent one of the sleeve bearings.

5. The bushing connection system of claim 4, further comprising a second outer cup bushing located on the second portion of the pin.

6. The bushing connection system of claim 1, wherein the external side of the retainer cap includes a countersink for receiving a head of a fastener.

7. The bushing connection system of claim 1, wherein the relief on the external side of the retainer cap is further configured for gripping with a tool other than the fastening tool.

8. The bushing connection system of claim 1, further comprising grooves on outer surfaces of any one or more of the inner cone bushing, the inner cup bushing, the outer cone bushing and the outer cup bushing.

9. The bushing connection system of claim 1, further comprising slots extending axially through a thickness of the outer cone bushing, and extending from opposite ends of the outer cone bushing, the slots shorter than an axial length of the outer cone bushing.

10. The bushing connection system of claim 1:
at least one inner cup bushing and at least one inner cone bushing have a first complementary counter-taper;
the outer cup bushing and the outer cone bushing have a second complementary counter-taper; and,
wherein when the connection system is assembled and tightened with a fastening tool, the first and second complementary tapers permit sliding engagement and alignment of the bushing connection system to compensate for misalignment.

11. The bushing connection system of claim 1, comprising a second threaded hole in the second end of the pin.

12. The bushing connection system of claim 11, further comprising:
a second outer cone bushing located on the pin adjacent to a thrust bearing;
a second outer cup bushing located on top of the second outer cone bushing; and,
the second outer cone bushing and the second outer cup bushing adjacent to the second end of the pin.

13. The bushing connection system of claim 11, further comprising:
a second retainer cap having an internal side and an external side;
a connecting passage from the internal to the external side;
the internal side of the retainer cap having a compression boss and a relief receivable of the second end of the pin;
the external side of the retainer cap configured to engage a fastening tool, and having a radial slot or bore receivable of a locking pin.

14. The bushing connection system of claim 11, further comprising grooves on outer surfaces of any one or more of the inner cone bushing, the inner cup bushing, the outer cone bushing, and the outer cup bushing.

15. The bushing connection system of claim 11, further comprising slots extending axially through a thickness of the outer cone bushing, and extending from opposite ends of the outer cone bushing, the slots shorter than an axial length of the outer cone bushing.

16. The bushing connection system of claim 11, wherein the relief on the external side of the retainer cap is further configured for gripping with a tool other than the fastening tool.

17. The bushing connection system of claim 11, wherein at least one of the inner cup bushing and the inner cone bushing have a first complementary counter-taper, and wherein the outer cup bushing and the outer cone bushing have a second complementary counter-taper, such that when the connection system is assembled, and tightened with a fastening tool, the first and second complementary tapers permit sliding engagement and alignment of the bushing connection system to compensate for misalignment.

18. The misalignment-compensation bushing connection system of claim 11, wherein the external side of the retainer cap includes a countersink for receiving a head of a fastener.

19. The misalignment-compensation bushing connection system of claim 1, wherein the first threaded hole is offset from the center of the first end of the pin.

20. The misalignment-compensation bushing connection system of claim 11, wherein the first and second threaded holes are off-set from centers of their respective ends of the pin.

* * * * *